US007316626B2

(12) United States Patent
Oishi et al.

(10) Patent No.: US 7,316,626 B2
(45) Date of Patent: Jan. 8, 2008

(54) ENGINE

(75) Inventors: Akifumi Oishi, Shizuoka-ken (JP);
Yousuke Ishida, Shizuoka-ken (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 693 days.

(21) Appl. No.: 10/477,468

(22) PCT Filed: Apr. 8, 2003

(86) PCT No.: PCT/JP03/04465

§ 371 (c)(1),
(2), (4) Date: Apr. 30, 2004

(87) PCT Pub. No.: WO03/085285

PCT Pub. Date: Oct. 16, 2003

(65) Prior Publication Data

US 2004/0171449 A1    Sep. 2, 2004

(30) Foreign Application Priority Data

Apr. 8, 2002    (JP) .............................. 2002-105060

(51) Int. Cl.
*B62J 13/04*    (2006.01)
*F16H 7/02*    (2006.01)

(52) U.S. Cl. .................. 474/144; 474/8; 474/201; 123/90.15; 123/195 A

(58) Field of Classification Search ............ 474/11–15, 474/8, 17, 23, 25, 18, 28, 46, 70, 144, 146, 474/201, 242; 180/69.3, 223–224, 219; 74/606 R; 123/90.33, 196 R, 90.15, 195 A
See application file for complete search history.

(56) References Cited

U.S. PATENT DOCUMENTS

| 4,655,732 | A | | 4/1987 | Takashima |
| 5,725,446 | A | * | 3/1998 | Kaku et al. .................. 474/13 |
| 5,857,441 | A | * | 1/1999 | Yonezawa et al. ....... 123/90.33 |
| 6,267,700 | B1 | | 7/2001 | Takayama |
| 6,338,688 | B1 | * | 1/2002 | Minami et al. ............. 474/144 |
| 6,481,408 | B2 | * | 11/2002 | Tsutsumikoshi ........ 123/195 R |

FOREIGN PATENT DOCUMENTS

| EP | 0257646 | 3/1988 |
| EP | 0604936 | 7/1994 |
| EP | 0610617 | 8/1994 |

(Continued)

*Primary Examiner*—Marcus Charles
(74) *Attorney, Agent, or Firm*—Hogan & Hartson LLP

(57) ABSTRACT

An engine having an engine case on one side of which a V-belt type of continuously variable transmission is provided, the CVT being placed in a transmission case and constituted that a V-belt is routed around a drive pulley and a driven pulley, the drive pulley being attached to one end of a crankshaft, the driven pulley being attached to one end of a transmission shaft parallel to the crankshaft, characterized in that
the crankshaft is supported for free rotation with the engine case, one end of the crankshaft is projected in cantilever fashion from the engine case into the transmission case, the drive pulley is attached to the projected portion, and the transmission case is made as a component separate from or independent of the engine case and supported with the engine case so that a space is present between the engine case and the transmission case.

25 Claims, 19 Drawing Sheets

FOREIGN PATENT DOCUMENTS

| | | |
|---|---|---|
| EP | 1020350 | 7/2000 |
| EP | 1138591 | 10/2001 |
| EP | 1170480 | 1/2002 |
| EP | 1170480 A2 | 1/2002 |
| EP | 1201535 | 5/2002 |
| FR | 2807489 | 3/2001 |
| JP | 59-188790 | 12/1984 |
| JP | 60-75192 | 5/1985 |
| JP | 62-50372 | 3/1987 |
| JP | 63-67453 A * | 3/1988 ................ 474/13 |
| JP | 64-52934 | 3/1989 |
| JP | 5-68398 | 9/1993 |
| JP | 05-229470 A * | 9/1993 ................ 180/219 |
| JP | 06-201024 A * | 7/1994 ............ 123/196 R |
| JP | 7-27180 | 1/1995 |
| JP | 11-278357 A * | 10/1999 |
| JP | 3095024 | 8/2000 |
| JP | 2001-3723 A * | 1/2001 |
| JP | 2001-271621 | 10/2005 |

\* cited by examiner

ENGINE

FIELD OF THE INVENTION

The present invention relates to an engine with a V-belt type of continuously variable transmission (CVT) on one side in the crankshaft direction of the engine case that is appropriate for use, for example, on motorcycles.

TECHNICAL BACKGROUND

Some of the engines for use on motorcycles, for example, are provided with a V-belt type of CVT located on the axially outer side of the engine case and comprising a drive pulley attached to one end of the crankshaft, a driven pulley attached to one end of a transmission shaft placed parallel to the crankshaft, and a V-belt placed around the both pulleys.

A conventional engine with such a type of CVT is disclosed for example in a laid-open Japanese patent No. 3095024 constituted that part of the engine case is defined as a transmission case into which one end of the crankshaft and one end of the transmission shaft are made to extend in cantilever fashion, and that their distal ends are provided with the drive pulley and the driven pulley around which a V-belt is routed.

Another arrangement disclosed in a laid-open Japanese patent No. 2002-021989 is constituted that the transmission case is formed separately from the engine case, the fore-end portions of the crankshaft and the transmission shaft are supported through bearings with the transmission case, and air is introduced into the transmission case.

An example of V-belt disclosed in a laid-open Japanese patent No. Hei 07-027180 has a surface, to be in contact with the drive and driven pulleys, made of a resin member.

Still another example disclosed in a Japanese patent No. Hei 05-068398 is arranged that the lubricant oil chamber formed in the engine case is made to swell to be located below the V-belt type of CVT.

When the V-belt type of CVT is located on the side of the engine case, the temperature in the transmission case is likely to rise due to heat from the engine and heat generated by friction of the V-belt. The V-belt in particular is likely to deteriorate with the thermal effect and its insufficient durability is a problem. Therefore, the engine with the V-belt type of CVT on the side portion of the engine requires an arrangement that can prevent the temperature in the transmission case from rising, prevent the V-belt from deteriorating due to the temperature rise, and extend the durability of the V-belt.

An advantage of the present invention made in view of the situations with the prior art described above is to provide an engine that can prevent the temperature in the transmission case from rising, prevent the V-belt from prematurely deteriorating due to the temperature rise, and extend the durability of the V-belt.

SUMMARY OF THE INVENTION

An embodiment of the present invention is an engine having an engine case on one side of which a V-belt type of continuously variable transmission is provided. The CVT placed in a transmission case and constituted that a V-belt is routed around a drive pulley and a driven pulley. The drive pulley is attached to one end of a crankshaft. The driven pulley is attached to one end of a transmission shaft parallel to the crankshaft. The crankshaft is supported for free rotation with the engine case. One end of the crankshaft is projected in a cantilever fashion from the engine case into the transmission case. The drive pulley is attached to the projected portions, and the transmission case is made as a component separate from or independent of the engine case and supported with the engine case so that a space is present between the engine case and the transmission case.

The "engine case" as used herein is a general term including the following cases: the crankcase in which the crankshaft is placed, the clutch case in which the clutch mechanism is housed, and the generator case in which the generator is placed. Each case is formed partially or wholly to be integral with other case or cases, or separately formed.

The invention described above is an engine having an engine case on one side of which a V-belt type of continuously variable transmission (CVT) is provided. The CVT is placed in a transmission case and constituted that a V-belt is routed around a drive pulley and a driven pulley. The drive pulley is attached to one end of a crankshaft. The driven pulley is attached to one end of a transmission shaft placed parallel to the crankshaft. The transmission shaft is supported for free rotation with the engine case. One end of the transmission shaft is made to project in a cantilever fashion from the engine case into the transmission case. A clutch mechanism is attached to part of the transmission shaft located in the engine case. The driven pulley is attached to the projected portion. The transmission case is made as a component separate from or independent of the engine case and supported with the engine case so that a space is present between the engine case and the transmission case.

The invention described above is an engine having an engine case on one side of which a V-belt type of continuously variable transmission (CVT) is provided. The CVT is placed in a transmission case and constituted that a V-belt is routed around a drive pulley and a driven pulley. The drive pulley is attached to one end of a crankshaft. The driven pulley is attached to one end of a transmission shaft parallel to the crankshaft. The crankshaft and said the transmission shaft are supported for free rotation with the engine cases. One end of the crankshaft and one end of the transmission shaft are projected in a cantilever fashion from the engine case into the transmission case. The drive pulley is attached to the projected portion of the crankshaft. The driven pulley is attached to the projected portion of the transmission shaft. The transmission case is made as a component separate from or independent of the engine case and supported with the engine case so that a space is present between the engine case and said the transmission case.

According to the invention described above at least part of the side surface of the transmission case that faces the engine case is a resin member. The V-belt is a resinous belt formed by connecting together a plural number of blocks, with part of each block in contact with the drive pulley and the driven pulley being made of a resin member. A lubricant oil chamber formed at the engine case is made to swell out below the transmission case so that a space is present between the lubricant oil chamber and the transmission case. The drive pulley and driven pulley are made up of fixed pulley halves fixed to the crankshaft and transmission shaft and movable pulley halves that can axially slide on the crankshaft and transmission shaft. The movable pulley halves of the drive pulley and driven pulley are placed respectively on the inner side and outer side with respect to the crankshaft direction. A centrifugal clutch mechanism is attached to the transmission shaft on the inner side with respect to the crankshaft direction and adjacent to the driven pulley.

According to an embodiment of the present invention, the movable pulley half of the driven pulley is urged toward the fixed pulley half with a coil spring located on the outer side, with respect to the crankshaft direction, of the movable pulley half, and a nut for attaching the driven pulley to the transmission shaft is placed to sink inside, with respect to the crankshaft direction, of the outer end of the coil spring.

The fixed pulley half is formed with a cylindrically shaped slide collar, with the slide collar fixed to the transmission shaft with a nut screwed to the transmission shaft so as to sink in the slide collar. The coil spring is placed between a spring receiving member attached to the outer open edge of the slide collar and the movable pulley half. The slide collar has an inside diameter greater than the outside diameter of the transmission shaft. The fore-end portion of the transmission shaft has an outside diameter smaller than that of the other portion of the transmission shaft, and the nut is screwed onto the small diameter portion. According to an embodiment of the present invention, an engine includes an engine case on one side of which a V-belt type of continuously variable transmission (CVT) is provided. The CVT is placed in a transmission case and constituted that a V-belt is routed around a drive pulley and a driven pulley. The drive pulley is attached to one end of a crankshaft, and the driven pulley is attached to one end of a transmission shaft parallel to the crankshaft. The crankshaft and the transmission shaft are supported for free rotation with the engine case and the transmission case is made as a component separate from or independent of the engine case and supported with the engine case so that a space is present between the engine case and the transmission case. At least part of the side surface of the transmission case that faces the engine case is a resin member. Also, at least part of the transmission case supported with the engine case is a resin member. The transmission case is divided in the crankshaft direction into plural parts and, of the plural parts, those that face the engine ease are resin members. According to an embodiment of the present invention, the V-belt is a resinous belt formed by connecting together a plural number of blocks, with part of each block in contact with the drive pulley and the driven pulley being made of a resin member. A lubricant oil chamber formed at the engine case is made to swell out below the transmission case so that a space is present between the lubricant oil chamber and the transmission ease.

According to another embodiment of the present invention, an engine includes an engine case on one side of which a V-belt type of continuously variable transmission (CVT) is provide. The CVT placed in a transmission case and constituted that a V-belt is routed around a drive pulley and a driven pulley. The drive pulley is attached to one end of a crankshaft and the driven pulley is attached to one end of a transmission shaft parallel to the crankshaft. The crankshaft and the transmission shaft are supported for free rotation with the engine case, and the transmission case is made as a component separate from or independent of the engine case and supported with the engine case so that a space is present between the engine case and the transmission case. The V-belt is a resinous belt formed by connecting together a plural number of blocks, with part of each block in contact with the drive pulley and the driven pulley is made of a resin member. A lubricant oil chamber formed at the engine case is made to swell out below the transmission case so that a space is present between the lubricant oil chamber and the transmission case.

According to a further embodiment of the present invention, an engine includes an engine case on one side of which a V-belt type of continuously variable transmission (CVT) is provided. The CVT is placed in a transmission case and constituted that a V-belt is routed around a drive pulley and a driven pulley. The drive pulley is attached to one end of a crankshaft an the driven pulley is attached to one end of a transmission shaft parallel to the crankshaft. The crankshaft and the transmission shaft are supported for free rotation with the engine case. The transmission case is made as a component separate from or independent of the engine case and supported with the engine case so that a space is present between the engine case and the transmission case. A lubricant oil chamber formed at the engine case is made to swell out below the transmission case so that a space is present between the lubricant oil chamber and the transmission case.

According to an embodiment of the present invention, the transmission case is provided with an inlet for introducing air inward and outlets for discharging air outward, with the outlets open and directed toward the space between the transmission case and the engine case. The outlets are formed to be located in the area of the transmission case above the line interconnecting the crankshaft and transmission shaft. Also, the outlets are formed to be located between the crankshaft insertion hole and the transmission shaft insertion hole of the transmission case. A wall portion is formed to cover from above the space between the transmission case and the engine case. Also, the wall portion leaves open the lower portion only of the space between the transmission case and the engine case and covers the rest part of the space. At least part of the wall portion is formed as part of the transmission case and is made of a resin member. The transmission case is generally of a tightly sealed constitution and the V-belt is a resin-made belt formed by connecting together a plural number of blocks, with part of each block in contact with the drive pulley and the driven pulley is made of a resin member.

Incidentally, the term "lubricant oil" chamber as used herein refers to the area in which lubricant oil is collected, and includes for example the oil pan into which lubricant oil comes down and collects, and the oil filter located on the delivery side of an oil pump to collect and filter lubricant oil.

DETAILED DESCRIPTION OF THE PREFERRED EMBODIMENTS

The embodiments of the present invention will be hereinafter described in reference to the appended drawings.

Figure 1:
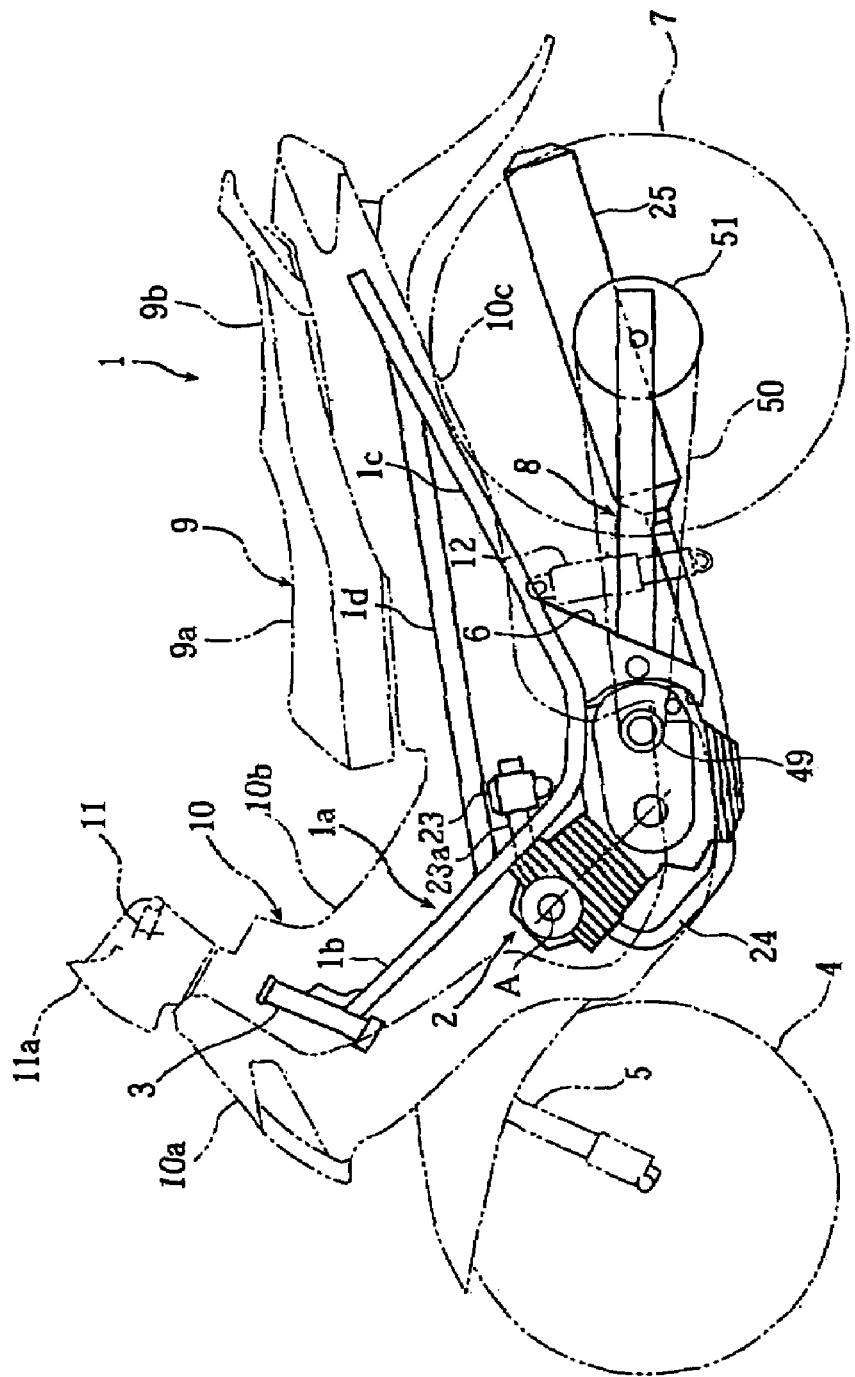
FIG. 1 is a left side view of the motorcycle on which an engine according to an embodiment of the present invention is mounted.
Figure 2:
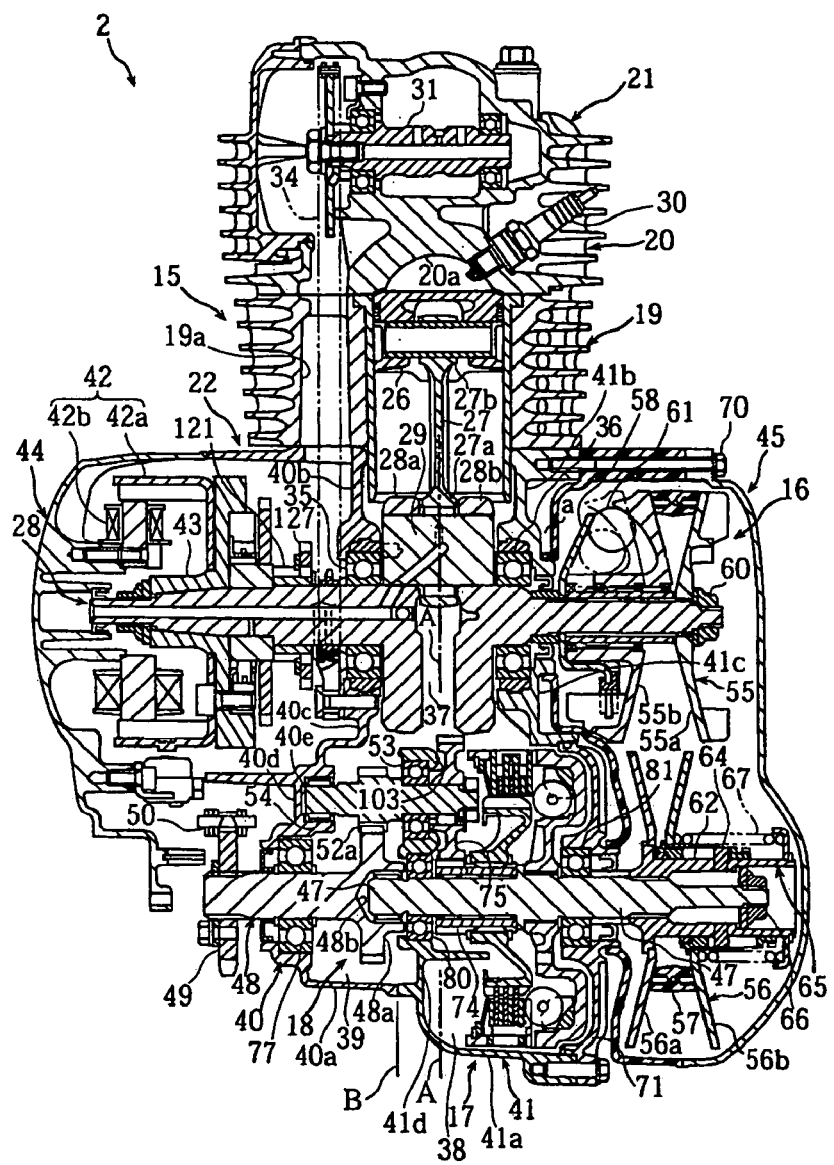
FIG. 2 is a sectional plan view extended along the line II-II in FIG. 6 of the above engine.
Figure 3:
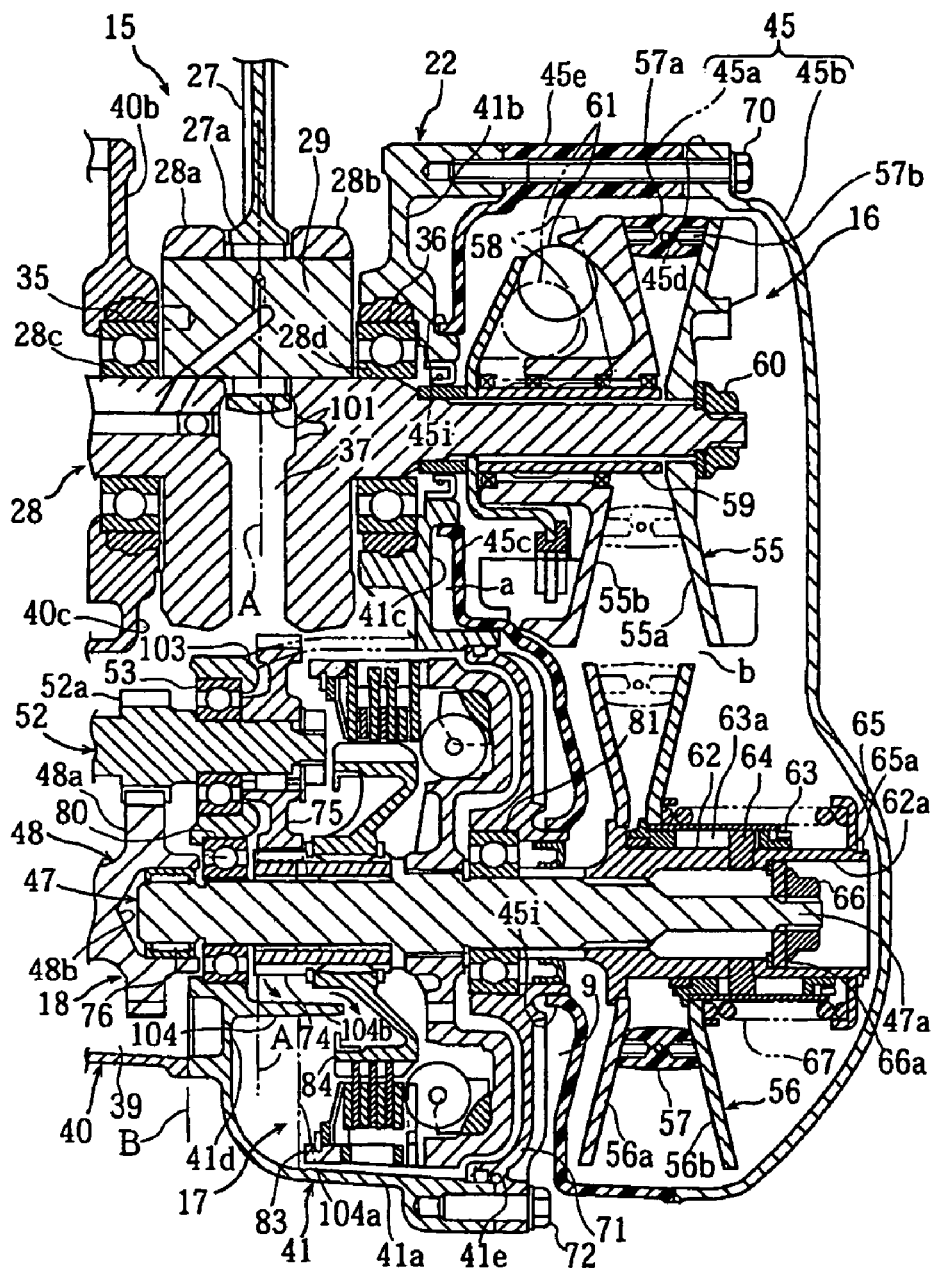
FIG. 3 is a sectional plan view of the CVT mechanism and the centrifugal clutch mechanism portion of the above engine.
Figure 4:
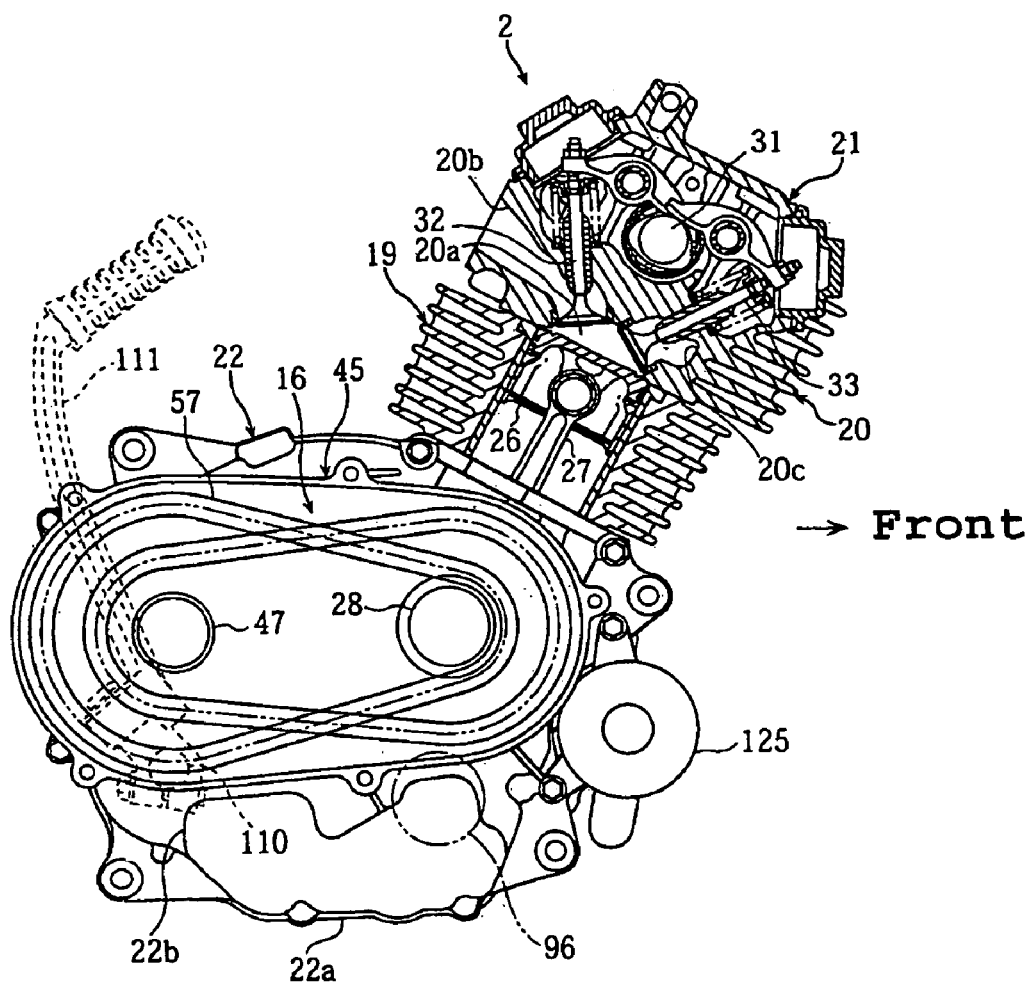
FIG. 4 is a right side view of the above engine.
Figure 5:
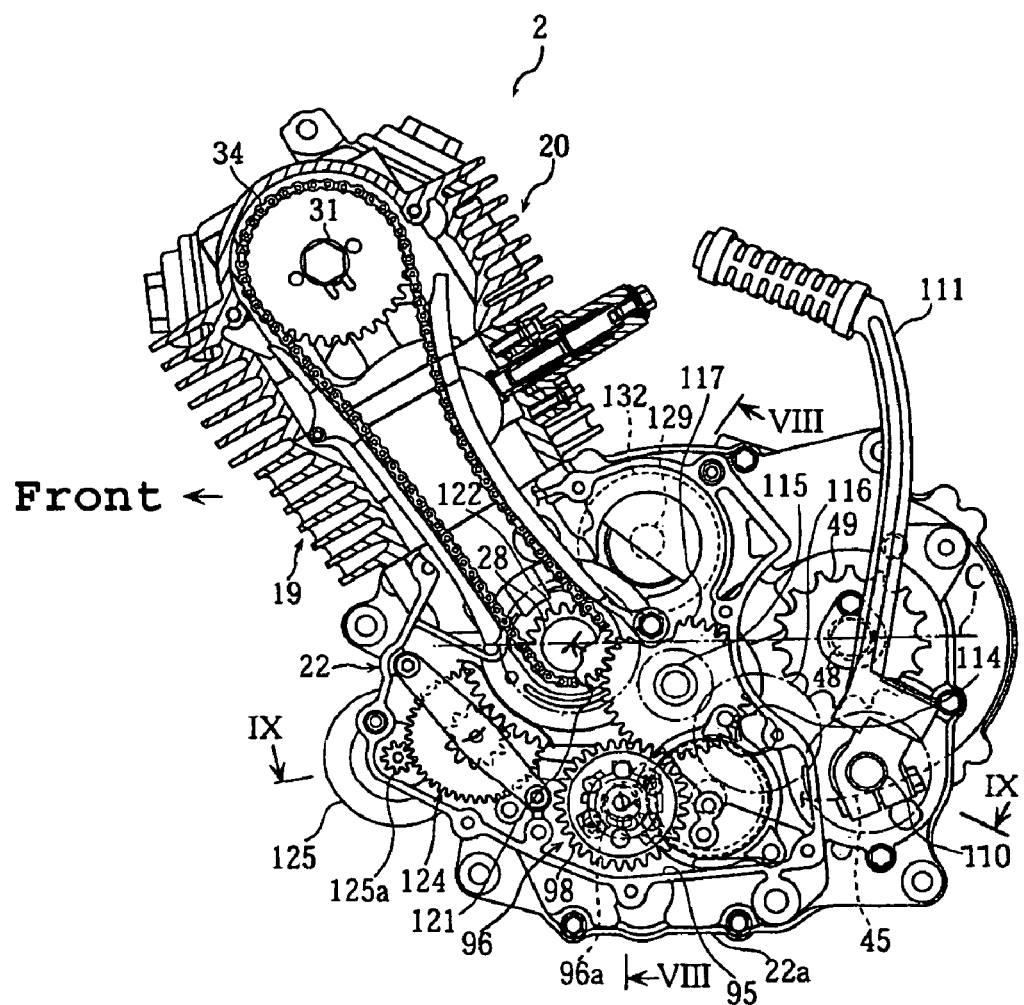
FIG. 5 is a left side view of the above engine.
Figure 6:
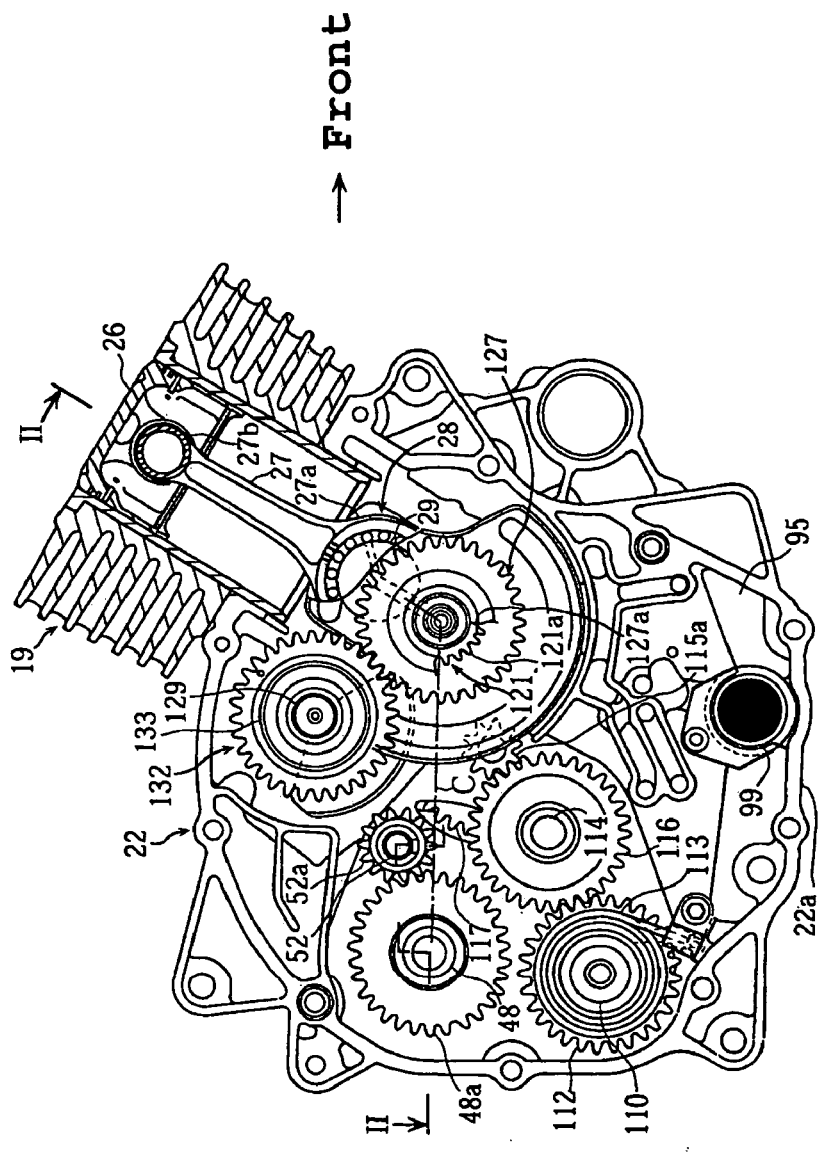
FIG. 6 is a right side view of the above engine with the CVT mechanism and the centrifugal clutch mechanism removed.
Figure 7:
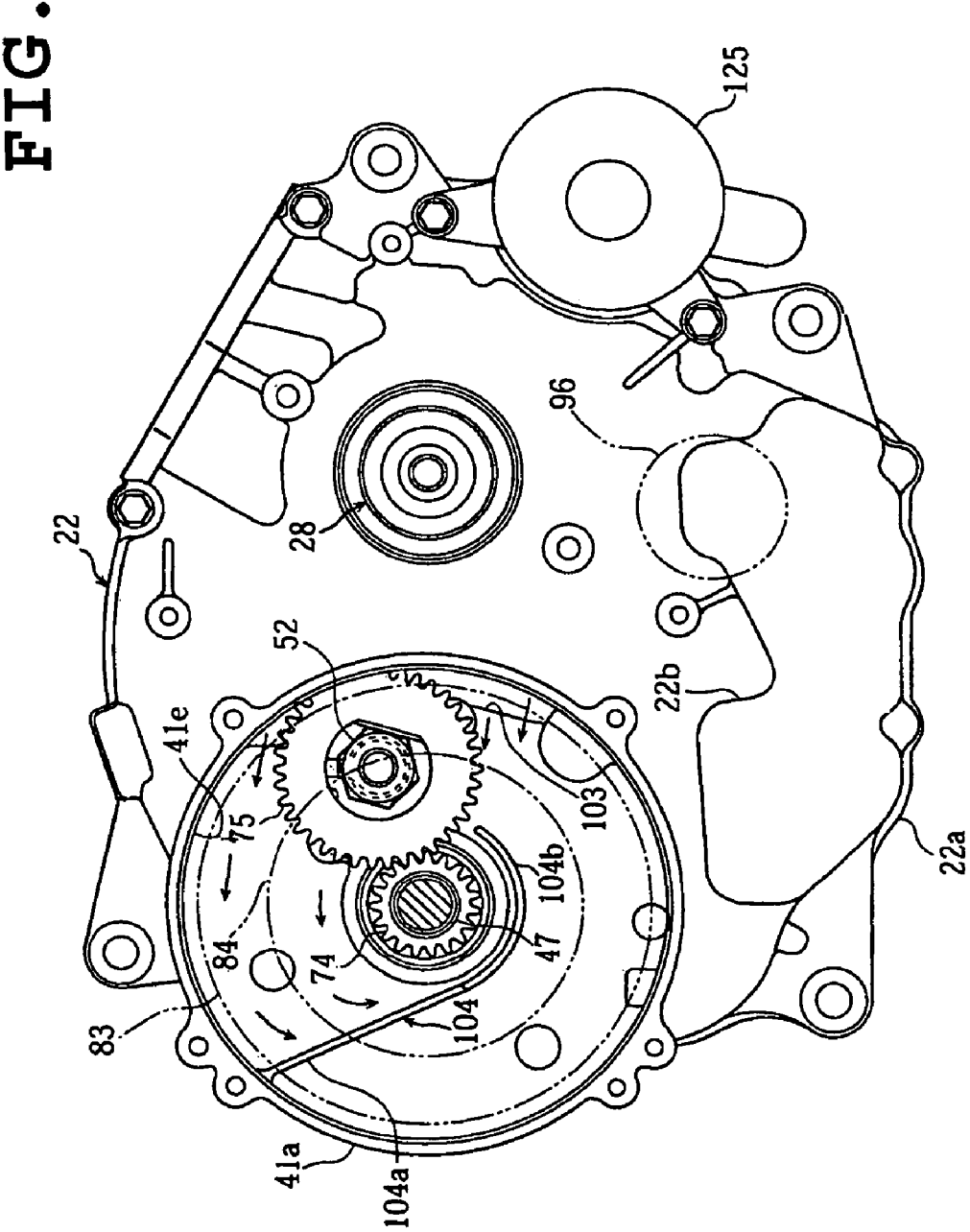
FIG. 7 is a right side view of the crankcase of the above engine.
Figure 8:
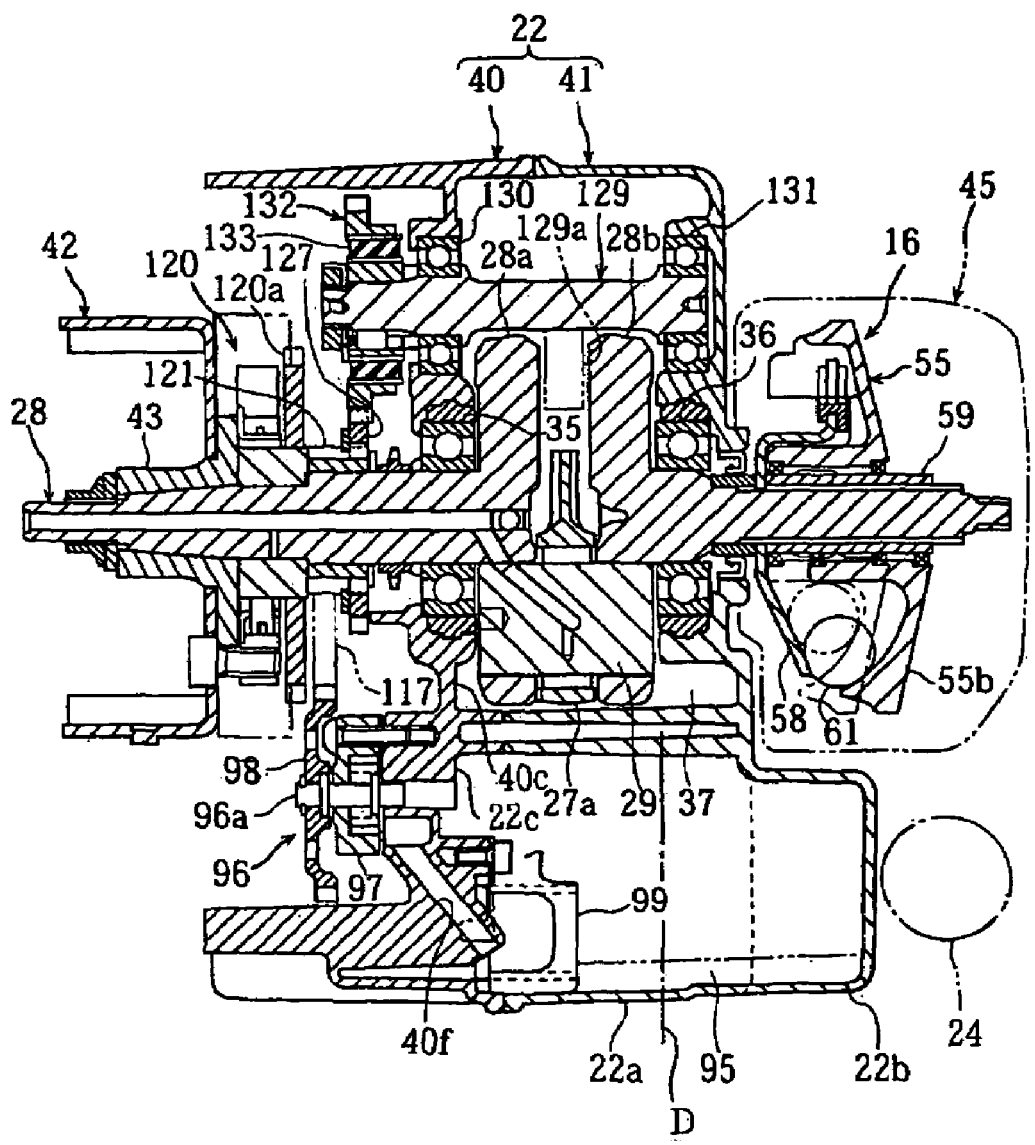
FIG. 8 is a sectional rear view along the line VIII-VIII in FIG. 5 of the above crankcase.
Figure 9:
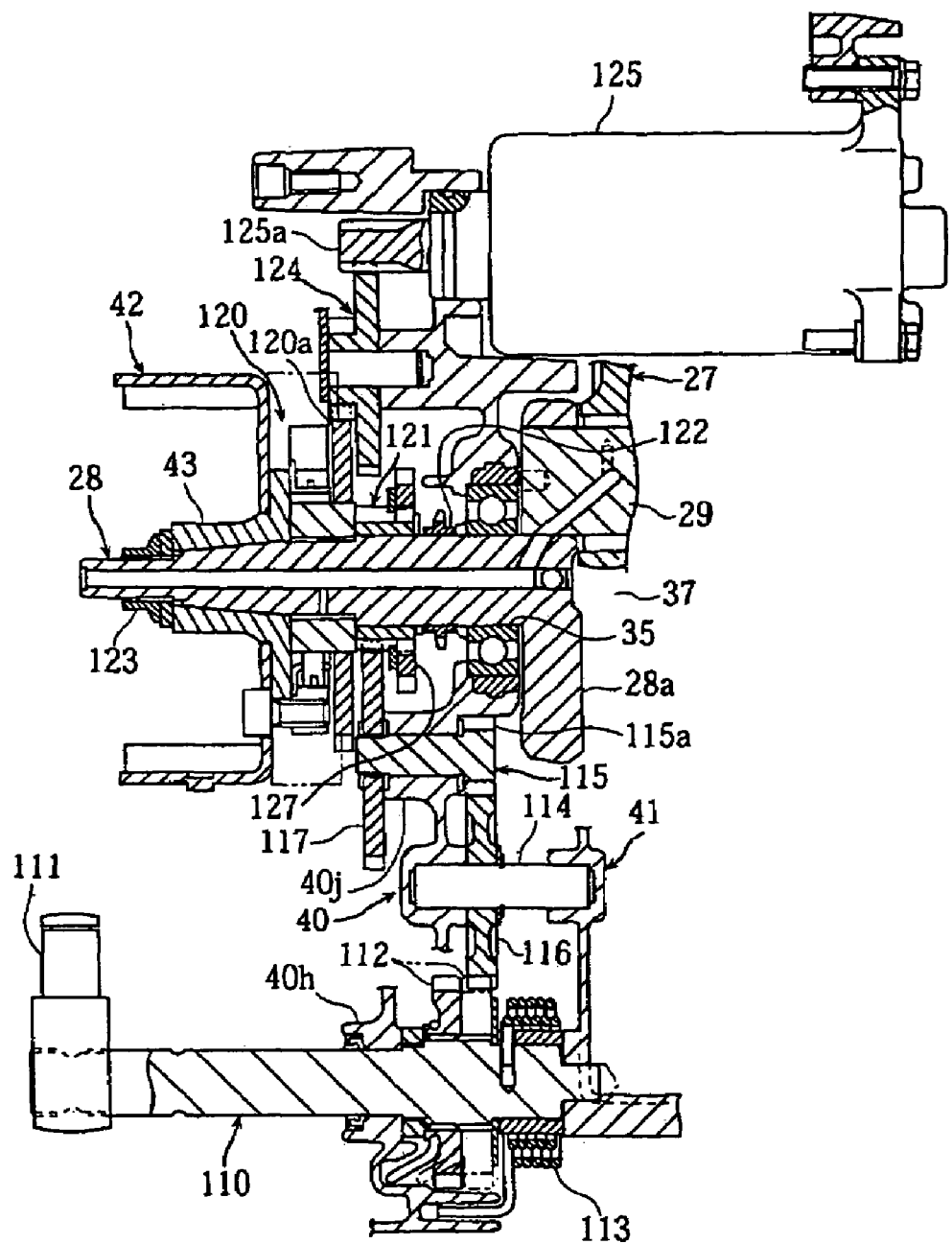
FIG. 9 is a sectional view of the kick mechanism of the above engine as seen along the line IX-IX in FIG. 5.
Figure 10:
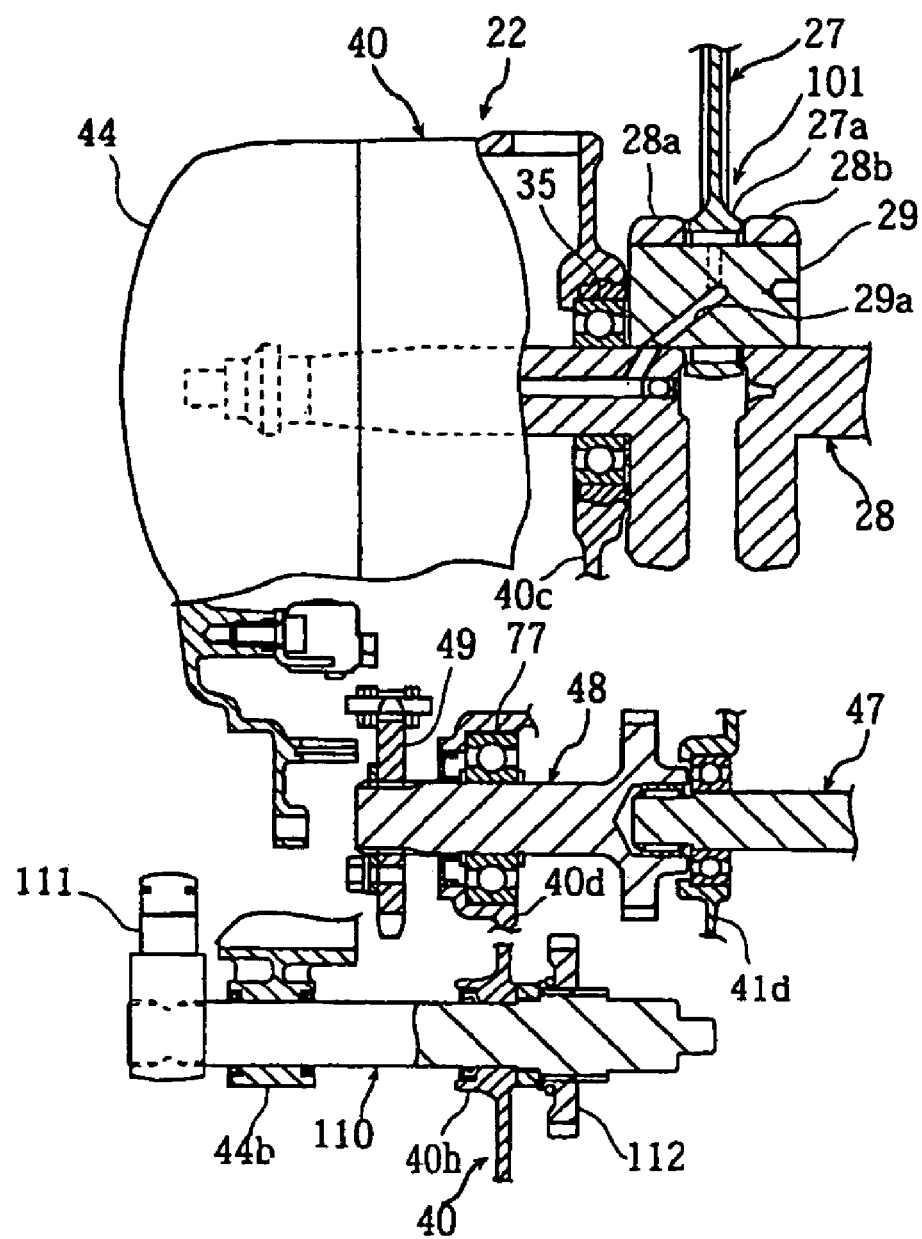
FIG. 10 is a sectional view of the above kick mechanism.
Figure 11:
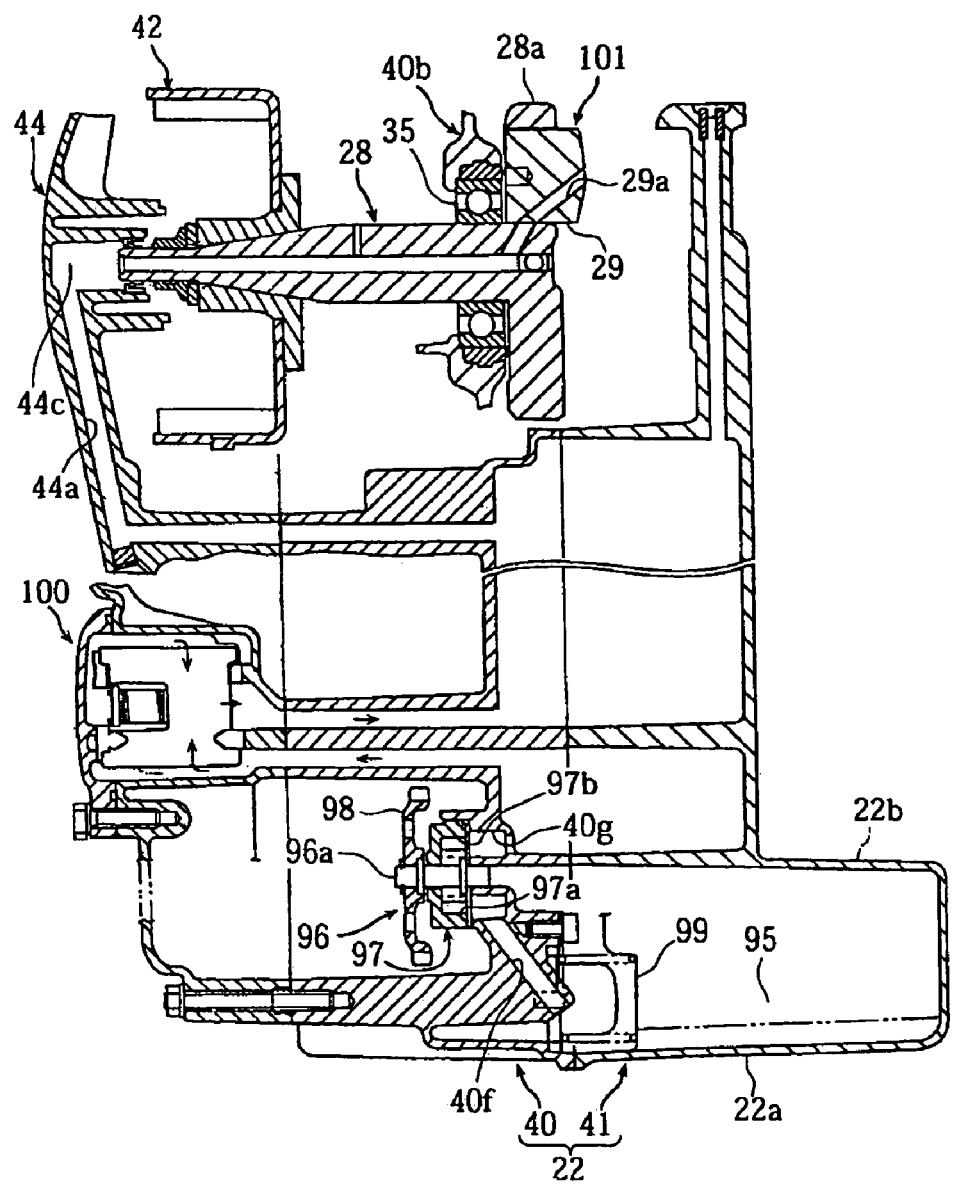
FIG. 11 is a sectional rear view showing the lubricant oil path of the above engine.
Figure 12:
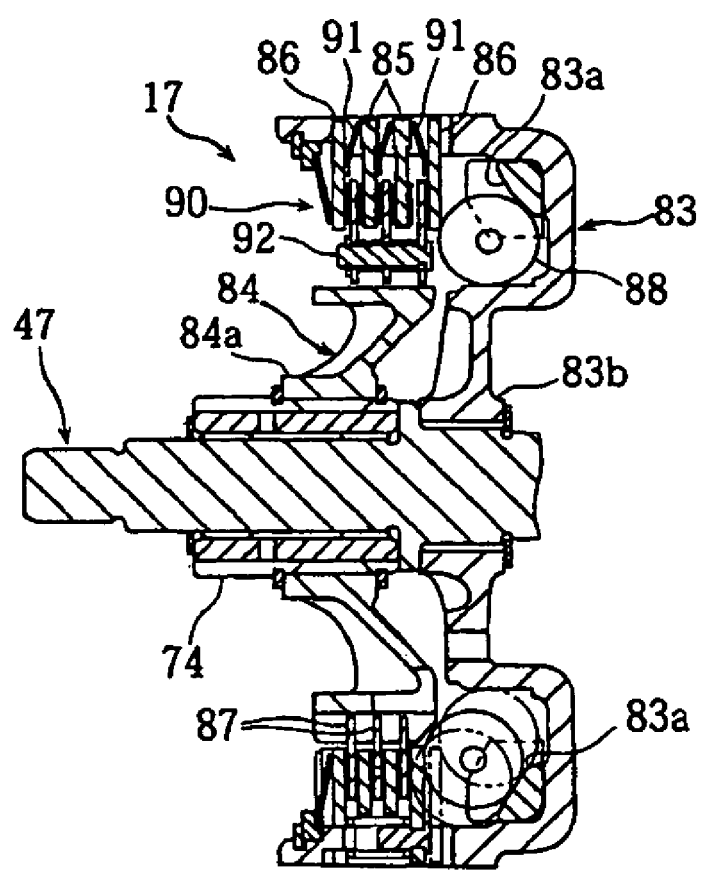
FIG. 12 is a sectional view of the above centrifugal clutch.
Figure 13:
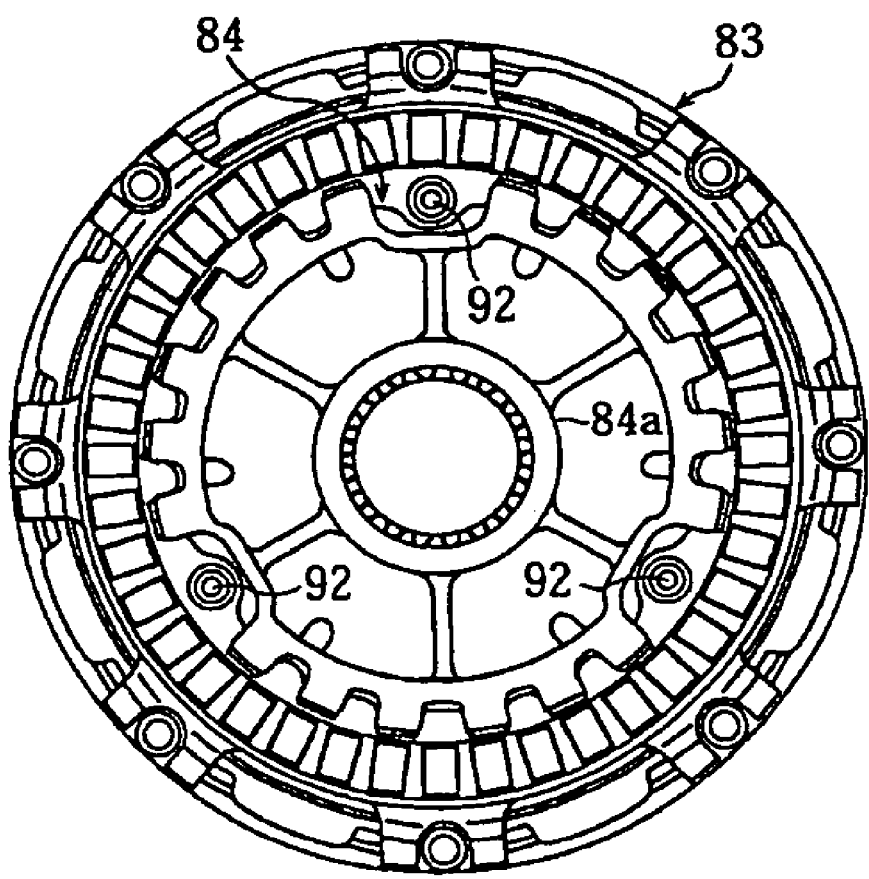
FIG. 13 is a side view of the above centrifugal clutch.
Figure 14:
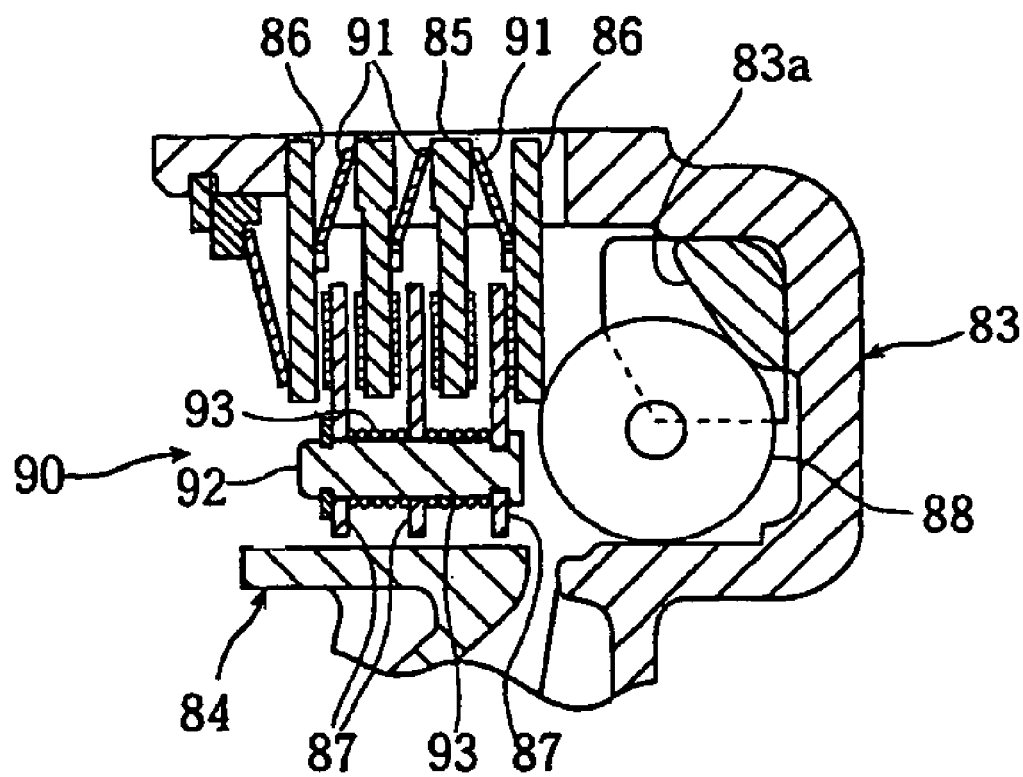
FIG. 14 is an enlarged sectional view of an essential part of the above centrifugal clutch.
Figure 15:
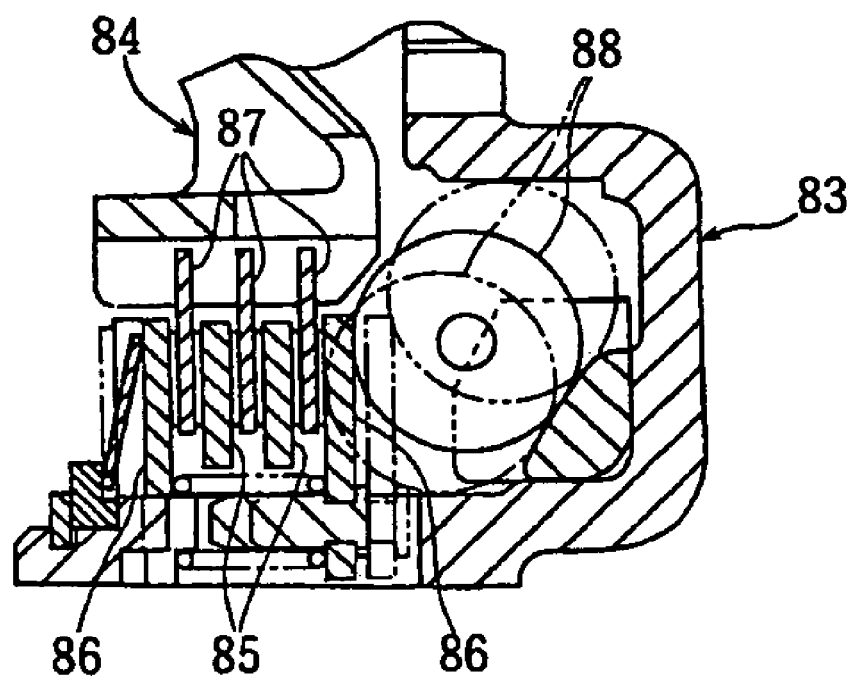
FIG. 15 is an enlarged sectional view of an essential part of the above centrifugal clutch.

FIGS. 1 to 15 are explaining a motorcycle engine as an embodiment of the present invention. FIG. 1 is a left side view of a motorcycle on which an engine as an embodiment of the present invention is mounted. FIG. 2 is a sectional plan view along the line II-II in FIG. 6 showing the extended state of the above engine. FIG. 3 is a sectional plan view of the CVT mechanism and the centrifugal clutch mechanism portion of the above engine. FIGS. 4 and 5 are right and left side views of the engine. FIG. 6 is a right side view of the above engine with the CVT mechanism and the centrifugal clutch mechanism removed. FIG. 7 is a right side view of the crankcase of the above engine. FIG. 8 is a sectional rear view along the line VIII-VIII in FIG. 5 of the above crankcase. FIG. 9 is a sectional view of the kick mechanism of the above engine as seen along the line IX-IX in FIG. 5. FIG. 10 is a sectional plan view around the kick shaft. FIG. 11 is a sectional rear view of the lubricant oil path of the above engine. FIGS. 12 and 13 are sectional view and side view of the above centrifugal clutch mechanism. FIGS. 14 and 15 are enlarged sectional views of an essential part of the above centrifugal clutch. Incidentally, the terms "right" and "left" as used herein are meant as seen from the rider seated on the seat.

To roughly describe the constitution of a motorcycle 1 shown in the drawings, an engine 2 of this embodiment is mounted on the motorcycle 1, a head pipe 3 is secured to the front end of a vehicle body frame 1a to support a front fork 5 that is capable of turning right and left about its axis and supports a front wheel 4 with a shaft, a rear arm bracket 6 secured to the central part of the vehicle frame 1a to support a rear arm 8 which supports a rear wheel 7 with a shaft for up and down swinging, and a seat 9 made up of a front rider's seat 9a and a rear rider's seat 9b is mounted on the vehicle body frame 1a.

The vehicle body frame 1a is made up of right and left down tubes 1b extending from the head pipe 3 obliquely rear downward, right and left upper tubes 1c extending from the rear ends of the down tubes 1b obliquely rear upward, and right and left seat rails 1d extending in the longitudinal direction of the vehicle to interconnect the down tubes 1b and upper tubes 1c. The vehicle body frame 1a is surrounded with a resinous vehicle body cover 10 made up of a front cover 10a, a leg shield 10b, and a side cover 10c.

Steering handlebars 11 are secured to the upper end of the front fork 5 and surrounded with a handlebars cover 11a. A rear damper 12 is suspended between the rear arm 8 and the rear arm bracket 6.

The engine 2 is an air-cooled, four-stroke, single cylinder engine and suspension-supported between rear lower parts of the down tubes 1b, with its cylinder axis tilted forward by about 45 degrees. The engine 2 comprises an engine unit 15, a V-belt type of CVT 16, a wet type, multi-plate, centrifugal clutch mechanism 17, and a reduction gear mechanism 18.

The engine unit 15, in rough description, is constituted with a cylinder block 19, a cylinder head 20 placed on the top mating surface of the cylinder block 19, a head cover 21 placed over the cylinder head 20, and a crankcase 22 attached to the bottom mating surface of the cylinder block 19 to house a crankshaft 28. To the left side surface of the crankcase 22 is attached a generator case 44 for housing a generator 42. The engine case of this embodiment is made up of the crankcase 22 and the generator case 44.

The rear surface of the cylinder head 20 is provided with an intake port 20b connected to a combustion recess 20a. The intake port 20b is connected through an intake pipe 23a to a carburetor 23. The front surface of the cylinder head 20 is provided with an exhaust port 20c connected to the combustion recess 20a. An exhaust pipe 24 is connected to the exhaust port 20c. The exhaust pipe 24 extends obliquely toward the right lower side of the engine, along under the transmission case 45 (to be described later) and the right side of a swelled portion of a lubricant oil chamber 22b, and obliquely rearward and is connected to a muffler 25 located to the right of the rear wheel 7. Into the combustion recess 20a is inserted an ignition plug 30.

The cylinder block 19 has a chain chamber 19a formed on the left side and interconnecting the interior of the crankcase 22 and the interior of the cylinder head 20. A timing chain 34 placed in the chain chamber 19a drives a camshaft 31 that drives to open and close an intake valve 32 and an exhaust valve 33 with the crankshaft 28.

In the cylinder bore of the cylinder block 19 is inserted a piston 26 for free sliding therein. The piston 26 is connected to the small end 27b of a connecting rod 27. The connecting rod 27, at its big end 27a, is connected to a crankpin 29 fitted between right and left crank arms 28a and 28b.

A transmission shaft 47 is placed behind and parallel to the crankshaft 28. An output shaft 48 is placed coaxially and to the left of the transmission shaft 47. The output shaft 48, at its left end, is provided with a drive sprocket 49 associated through a chain 50 with a driven sprocket 51 on the rear wheel 7.

A generator 42 is attached to the left end of the crankshaft 28. The generator 42 is constituted with a sleeve 43 taper-fitted onto the crankshaft 28, a rotor 42a secured to the sleeve 43, and a stator 42b secured, in a position radially opposite the rotor 42a, to the generator case 44.

The crankcase 22 is split into the first case 40 on the left side in the crankshaft direction and the second case 41 on the right side. The generator case 44 for housing the generator 42 is removably attached to the outer side, in the crankshaft direction, of the first case 40. The transmission case 45 serving to house the CVT 16 is attached to the outer side, in the crankshaft direction, of the second case 41.

The parting line B of the first and second cases 40 and 41 is slightly displaced to the left of the cylinder axis A. The first and second cases 40 and 41 are constituted, in rough description, with first and second peripheral walls 40a and 41a that are generally open toward outside in the crankshaft direction, on the inner side of which are integrally formed first and second support walls 40b and 41b that support the crankshaft 28.

The first support wall 40b of the first case 40 has a first crank support wall portion 40c for supporting, through a left side journal bearing 35, the left crank journal portion 28*c* of the crankshaft 28, and a reduction gear mechanism support wall portion 40*d* formed to project by a small amount to the left in the crankshaft direction relative to the first crank support wall portion 40*c*.

The second support wall 41*b* of the second case 41 has a second crank support wall portion 41*c* for supporting the right crank journal portion 28*d* of the crankshaft 28 through a right side journal bearing 36, and a clutch support wall portion (clutch one side support wall) 41*d* formed to project beyond the cylinder axis A to the left in the crankshaft direction relative to the second crank support wall portion 41*c*.

The crank arms 28*a*, 28*b*, and the crank pin 29 of the crankshaft 28 are housed in the crank chamber 37 formed with the first and second crank support wall portions 40*c* and 41*c*.

The centrifugal clutch mechanism 17 is housed in a clutch chamber 38 formed with the second peripheral wall 41*a* and the clutch support wall portion 41*d*. The clutch chamber 38 is separated from the crank chamber 37. In this embodiment, the wall portion that forms the clutch chamber 38 is referred to as the clutch case.

A reduction chamber 39 is formed with the reduction gear mechanism support wall portion 40*d* and the clutch support wall portion 41*d* to house the reduction gear mechanism 18, and communicates with the crank chamber 37.

The reduction gear mechanism 18 is constituted as follows: A reduction shaft 52 is placed parallel to the transmission shaft 47 between the support wall portions 40*d* and 41*d*. The right side portion of the reduction shaft 52 is supported through a reduction shaft bearing 53 with the clutch support wall portion 41*d* while its left side portion is supported through a reduction shaft bearing 54 with a recess 40*e* formed in the reduction gear mechanism support wall portion 40*d*. A primary reduction small gear 74 capable of making relative rotation is attached to the transmission shaft 47 placed in the clutch chamber 38. A primary reduction large gear 75 engaging with the primary reduction small gear 74 is secured with a key to the reduction shaft 52. The reduction shaft 52 located in the reduction chamber 39 is integrally formed with a secondary reduction small gear 52*a*. A secondary reduction large gear 48*a* engaging with the secondary reduction small gear 52*a* is integrally formed with the output shaft 48.

The output shaft 48 is placed coaxially with the transmission shaft 47. The right end portion of the output shaft 48 is recess-formed with a support hole 48*b* into which the left end portion of the transmission shaft 47 is to be inserted. The right end portion of the output shaft 48 is supported with the transmission shaft 47 through a bearing 76 fitted in the support hole 48*b*. The left end portion of the output shaft 48 is passed through and supported with the reduction gear mechanism support wall portion 40*d* of the first case 40 through a bearing 77. The drive sprocket 49 is secured to the projecting end portion of the output shaft 48.

The V-belt type of CVT 16 housed in the transmission case 45 comprises a drive pulley and a driven pulley, with their belt routing diameters variable, around which a V-belt is routed. Details of the constitution are as follows.

The right outside end portion of the crankshaft 28, journaled with the crankcase 22, projects in cantilever fashion into the transmission case 45, and a drive pulley 55 is attached to the right outside end portion. The right outside end portion of the transmission shaft 47, journaled with the crankcase 22, projects as a cantilever into the transmission case 45, and a driven pulley 56 is attached to the right outside end portion. A V-belt 57 is routed around the drive pulley 55 and the driven pulley 56.

The V-belt 57 is made of resin that is heat resistant and durable. Details of the constitution are as follows. A large number of resin blocks 57*a*, made of a material such as polyamide resin mixed with carbon fibers or aramid fibers and formed in the shape of H lying on its side, are placed in succession and joined together using pairs of ring-shaped connecting members 57*b* made of highly heat resistant rubber. The right and left bevel surfaces of the resin block 57*a* serve as contact surfaces to the drive pulley 55 and the driven pulley 56.

The drive pulley 55 is made up of a fixed pulley half 55*a* and a movable pulley half 55*b*, with the former fixed to the right end portion of the crankshaft 28 while the latter placed on the inner side, in the crankshaft direction, of the fixed pulley half 55*a*, arranged to be axially slidable and rotatable together with the crankshaft 28 through a slide collar 59. A cam plate 58 and the slide collar 59 are spline-fitted onto the right end portion of the crankshaft 28, on the axially outer side of which is attached the fixed pulley half 55*a* and secured by means of a locking nut 60. Cylindrical weights 61 are placed between the movable pulley half 55*b* and the cam plate 58. As the crankshaft 28 rotates faster, the weights 61 move radially outward by centrifugal force to move the movable pulley half 55*b* axially to the right and increase the routing radius of the pulley. As a result, reduction ratio decreases.

The driven pulley 56 is made up of a fixed pulley half 56*a* and a movable pulley half 56*b*, with the former fixed to the right outside end portion of the transmission shaft 47 while the latter placed on the outer side, in the crankshaft direction, of the fixed pulley half 56*a*, to be axially slidable. A cylindrical slide collar 62 secured to the axially central portion of the fixed pulley half 56*a* is spline-fitted onto the transmission shaft 47. A cylindrical boss member 63 secured to the axially central portion of the movable pulley half 56*b* is fitted, to be axially slidable, onto the slide collar 62. Guide pins 64 planted into the slide collar 62 engage with slide grooves 63*a* formed in the boss member 63 so that the guide pins 64 can slide and the movable pulley half 56*b* can rotate together with the fixed pulley half 56*a*.

At the fore-end portion of the slide collar 62 is attached a spring receiving member 65 of an annular plate shape by means of a retaining ring 65*a*. A coil spring 67 for constantly urging the movable pulley half 56*b* toward the fixed pulley half 56*a* is interposed between the spring receiving member 65 and the movable pulley half 56*b*.

The driven pulley 56 is pushed into a position recessed from the fore-end portion 62*a* of the slide collar 62 and secured to the transmission shaft 47 by means of a locking nut 66 screwed to the fore-end 47*a* of the transmission shaft 47.

Here, the inside diameter of the slide collar 62 is stepped to a diameter larger than the outside diameter of the transmission shaft 47, and the fore-end portion 47*a* of the transmission shaft 47 is stepped to a smaller diameter. In this way, because the part of the transmission shaft 47 for engaging with the locking nut 66 is made smaller in diameter, the locking nut 66 and the washer 66*a* are made small in diameter and can be placed smoothly to a position sunk in the slide collar 62. In this way, it is possible to place the locking nut 66 in a position recessed in the crankshaft direction from the spring receiving member 65 for the coil spring 67.

The transmission case 45 is constituted to be generally sealed and formed to be separate from or independent of the crankcase 22 in an elliptic shape as seen from the right (FIG. 4) so as to cover most of the right side of the crankcase 22. The transmission case 45 is constituted with two parts, a resinous case 45a of a bottomed box shape that is open toward the outer side in the crankshaft direction, and an aluminum lid 45b that closes the opening in airtight state.

The case 45a and the lid 45b are secured, using the boss portions 45e and 45d formed on the peripheral edges of those components and bolts 70, to the second case 41. The case 45a is formed with boss portions 45i and 45i coaxially with the crankshaft 28 and the transmission shaft 47 and fitted into the boss portions that fit-support the outer races of the bearings 36 and 81 on the crankcase side. In this way, the case 45a is arranged to be supported on the crankcase side even in the state of the bolts 70 being removed.

A space (a) is formed between the bottom wall 45c of the case 45a and the second case 41. The space (a) prevents heat of the engine 2 from being transmitted through the crankcase 22 to the transmission case 45 and restricts temperature rise in the transmission case 45 by permitting air flow caused as the vehicle runs between both of the cases.

The bottom portion 22a of the crankcase 22 is formed with a lubricant oil chamber 95 having an integrally formed, swell portion 22b swelling toward the underside of the transmission case 45 (see FIGS. 8 and 11). As a result of providing the lubricant oil chamber 95 with the swell portion 22b, the center line (D) of the lubricant oil chamber 95 as a whole including the swell portion 22b is displaced from the engine width center line (cylinder axis line A) toward the transmission case 45. The inside wall 22c of the lubricant oil chamber 95, opposite the transmission case 45, is in the same position, in the crankshaft direction, as the support wall 40c for supporting the left side journal bearing 35.

The swell portion 22b is formed, as seen in plan view, to be within the projected area of the transmission case 45. A space (b) is provided between the top surface of the swell portion 22b and the underside of the transmission case 45. The exhaust pipe 24 is arranged to pass the area that is within the plan view projection of the transmission case 45 and within the side view projection of the swell portion 22b.

According to the present embodiment, the crankshaft 28 and the transmission shaft 47 are supported rotatably with the crankcase 22 and their right outer ends are made to project in cantilever fashion into the transmission case 45 in a constitution that the distal-ends of the crankshaft 28 and the transmission shaft 47 require no journal support. As a result, no bearing portion is required on the transmission case 45 in particular on the lid 45b side, and accordingly the transmission case 45 as a whole can be reduced in size and weight.

Along with the cantilever constitution of the crankshaft 28 and the transmission shaft 47 as described above, the constitution for supporting the transmission case 45 with the crankcase 22 does not require so higher rigidity, so that the supporting constitution can be simplified. In other words, if the fore-end of the crankshaft 28 and the like were to be journal-supported, the transmission case 47 itself would have to be made with a high rigidity and connected to the crankcase 22 with a high rigidity to secure the bearing positioning accuracy.

Because the space (a) is provided between the transmission case 45 and the crankcase 22, heat of the engine is unlikely to be transmitted from the crankcase side to the transmission case 45. Moreover, the transmission case 45 is cooled and its temperature rise is restricted with the air flow moving through the space (a) when the vehicle runs, leading to improvement in the durability of the V-belt 57. Furthermore, since the transmission case 45 can be reduced in size and weight as described above, the area around the CVT 16 of the engine is restricted from becoming large in size even if the space (a) is provided.

Since the case 45a, serving as a crankcase side surface facing the crankcase 22, of the transmission case 45 is made of a resin member, the transmission case 45 is further reduced in size and weight and the durability of the V-belt 57 is improved because the temperature rise in the transmission case 45 is restricted. That is, use of the resin member increases the freedom in forming and so it is easy to form the transmission case 45 in a small size. Since resin members are higher in heat insulation property than aluminum alloy members commonly used for case members, temperature rise in the transmission case 45 is more reliably restricted by further restraining heat transmission.

Since the V-belt 57 is made as a resinous belt by joining together the resin blocks 57a by means of the connecting members 57b, heat generated with the V-belt is restrained. That is to say, the resinous belt with the portion in contact with the drive pulley 55 made of a resin member can produce the same transmission torque with a less squeezing force of the drive pulley 55 in comparison with, for example, a rubber belt. Accordingly the heat generated by friction between the V-belt 57 and the drive pulley 55 is reduced, so that the temperature rise of the belt is restrained.

As described above, it is possible to restrict temperature rise of the transmission case 45, restrict the friction-caused heat by making the V-belt with a resin member, and to enhance the heat resistance and durability of the belt in comparison with a rubber belt, so that the V-belt 57 requires no cooling. As a result, the transmission case 45 can be made in a sealed constitution to prevent water and dust from entering inside.

Since the bottom portion 22a of the crankcase 22 is formed with the swell portion 22b swelling toward the underside of the transmission case 45, the free space under the transmission case 45 is effectively used to increase the amount of lubricant oil in the lubricant oil chamber 95. Therefore, unlike the arrangement in which the depth of the case bottom is increased to secure the amount of lubricant oil, the height of the engine 2 does not need to be increased.

Since the bottom portion 22a of the crankcase 22 is made to swell out toward the underside of the transmission case 45, the surface area of the lubricant oil chamber 95 is increased, so that cooling property is improved accordingly and the weight balance of the engine as a whole is improved. Since the space (b) is provided between the swell portion 22b and the transmission case 45, heat of the lubricant oil in the swell portion 22b is prevented from being transmitted to the transmission case 45, and the transmission case 45 is cooled with the air flow occurring and flowing through the space (b) as the vehicle runs.

Here, since this embodiment is arranged that the V-belt is made of a resin member and the transmission case 45 is made to be independent of the crankcase 22, heat resistance and durability of the V-belt are enhanced in comparison with an arrangement using a rubber belt, and thermal effect from the engine is restricted. As a result, it is possible to reduce the diameters of the drive pulley 55 and the driven pulley 56, and the size of the transmission case 45. This makes it possible to produce a free space under the transmission case 45 and accordingly form the swell portion, increase the lubricant oil capacity, and secure the space for placing the exhaust pipe 24.

Since this embodiment is arranged that the movable pulley half 56b of the driven pulley 56 attached to the transmission shaft 47 is located on the outer side in the crankshaft direction of the fixed pulley half 56*a*, it is possible to secure a free space on the inner side of the driven pulley 56 of the transmission shaft 47 and use the space for placing the centrifugal clutch mechanism 17 adjacent to the fixed pulley half 56*a*. This makes it possible to coaxially place the output shaft 48 on part of the transmission shaft 47 located on the opposite side of the driven pulley 56 without increasing the engine width. As a result, unlike the conventional arrangement of placing the output shaft behind the transmission shaft, the engine size can be reduced in the longitudinal direction of the vehicle.

Since this embodiment is arranged that the locking nut 66 is placed in an axially recessed position using the spring receiving member 65 that supports the coil spring 67 for urging the movable pulley half 56*b* against the fixed pulley half 56*a*, it is possible to restrict the dimension of the engine from increasing in the vehicle width direction by reducing the amount of protrusion of the coil spring 67 toward the outer side in the transmission shaft direction with a simple constitution while securing necessary length of the coil spring 67.

Figure 16:
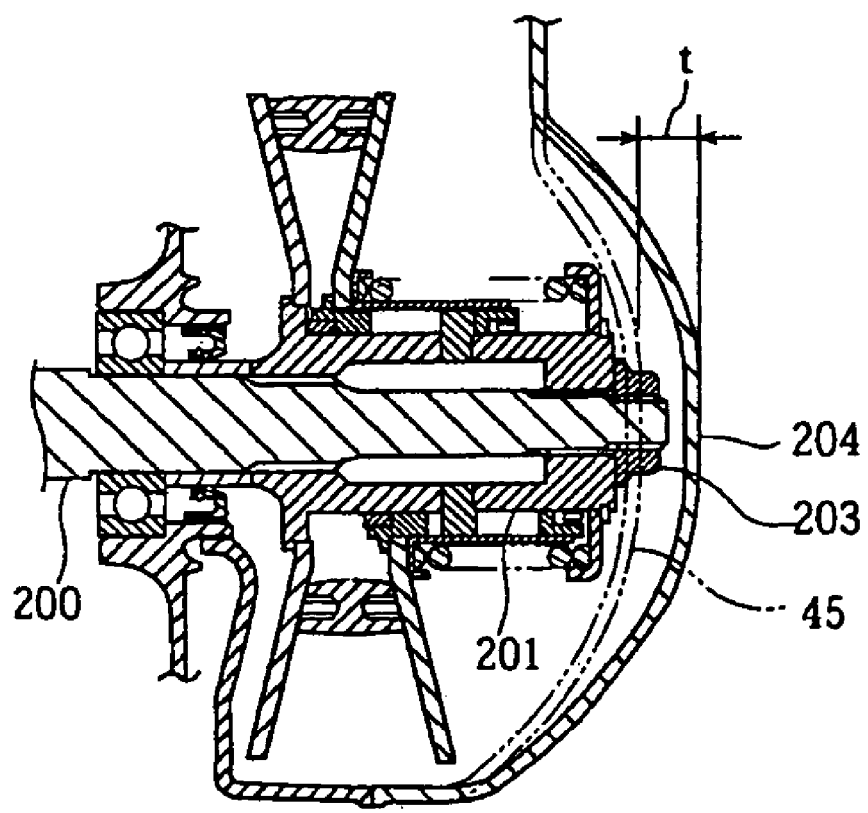
FIG. 16 is a sectional view of the conventional driven pulley generally in use.

In other words, in a constitution for example shown in FIG. 16 in which a slide collar 201 is secured to a transmission shaft 200 by tightening a locking nut 203 on the outside end surface of the slide collar 201, a transmission case 204 protrudes outward in the vehicle width direction according to the size of the locking nut 203. In contrast to the above, this embodiment is arranged that the locking nut 66 is placed in an axially recessed position from the outside end of the spring receiving member 65, so that the protrusion of the transmission case 45 is reduced by a dimension of (t), about 10 mm.

Since the coil spring 67 is located on the axially outer side, the coil spring 67 can be serviced easily after only removing the retaining ring 65*a*. If the movable pulley half were placed inside the fixed pulley half, or if the coil spring were placed axially on the inner side, servicing work efficiency would become poor because the entire driven pulley would have to be removed.

On the outer side in the crankshaft direction of the second peripheral wall 41*a* forming the clutch chamber 38 is formed an opening 41*e* of the size that permits the centrifugal clutch mechanism 17 to be put in and taken out. A clutch cover 71 (wall for supporting the other side of the clutch) is attached in air-tight state to the opening 41*e*. The clutch cover 71 is removably fixed to the opening edge of the second peripheral wall 41*a* by means of bolts 72. In this way, the transmission case 45 can be removed together with the driven pulley 56, and the centrifugal clutch mechanism 17 can be removed together with the transmission shaft 47 after removing the clutch cover 71.

The centrifugal clutch mechanism 17 is positioned and supported to be axially immovable with clutch bearings 80 on one side and 81 on the other side, with the former attached to the axially left end and the latter in the center of the transmission shaft 47. The clutch bearing 80 on one side is supported with the clutch support wall portion 41*d*. The clutch bearing 81 on the other side is supported with the clutch cover 71.

The clutch support wall portion 41*d* that supports the clutch bearing 80 and the reduction shaft bearing 53 is displaced toward the left of the second crank support wall portion 41*c* that supports the right hand journal bearing 36. In other words, it is located between the first crank support wall portion 40*c* that supports the left journal bearing 35 and the second crank support wall portion 41*c*. To put it more concretely, it is located on the cylinder axis A or slightly displaced from the cylinder axis A toward the parting line B.

The clutch cover 71 that supports the clutch bearing 81 on the other side is located more on the right outer side in the crankshaft direction than the second crank support wall portion 41*b* that supports the right journal bearing 36. The reduction gear mechanism support wall portion 40*d* that supports the left side bearing 77 of the output shaft 48 is located more on the left outer side than the first crank support wall portion 40*c* that supports the left journal bearing 35.

The crankcase 22 is parted in the crankshaft direction into the first and second cases 40 and 41. The transmission case 45 is placed on the outer side in the crankshaft direction of the second case 41. The centrifugal clutch mechanism 17 is located in the vicinity on the inner side in the crankshaft direction of the transmission case 45. As a result, it is possible to place the output shaft 48 coaxially with the transmission shaft 47 on the opposite side of the CVT 16 to reduce the longitudinal dimension of the engine 2 while restricting its width dimension.

Since the centrifugal clutch mechanism 17 is supported at two points with one and the other clutch bearings 80 and 81, the centrifugal clutch mechanism 17 is positioned in the axial direction and supported with a simple constitution without using separate components.

This embodiment is arranged that the clutch support wall portion 41*d* that supports the clutch bearing 80 on one side is placed between the first and second crank support wall portions 40*c* and 41*c* that support the left and right journal bearings 35 and 36 of the crankshaft 28 and the clutch cover 71 (wall for supporting the other side of the clutch) that supports the clutch bearing 81 on the other side is located on the outer side in the crankshaft direction of the second crank support wall portion 41*c* that supports the right journal bearing 36. Therefore, it is possible to secure the capacity of the clutch chamber 38 while reducing the distance between axes of the crankshaft 28 and the transmission shaft 47 in comparison with an arrangement in which the first crank support wall 40*c* and the clutch support wall 41 on one side are located on the same line, and the second crank support wall 41*c* and the clutch cover 71 are located on the same line, so that the centrifugal clutch mechanism 17 is housed compactly and the engine as a whole is made compact.

Since the clutch cover 71 is removably attached to the opening 41*e* of the second case 41, the work of maintenance and replacing parts can be made easily because the centrifugal clutch 17 can be removed together with the transmission shaft 47 after the transmission case 45 and the clutch cover 71 are removed.

In this embodiment, the output shaft 48 is located coaxially on the side, opposite the transmission case 45, of the transmission shaft 47, and the drive sprocket 49 is attached to the output shaft 48. Owing to this, it is possible to place coaxially the centrifugal clutch mechanism 17 and the drive sprocket 49 to reduce the engine size in the longitudinal direction of the vehicle.

The centrifugal clutch mechanism 17 is located near the inner side in the crankshaft direction of the driven pulley 56. The centrifugal clutch mechanism 17 is of a wet, multiple plate type, as mainly shown in FIGS. 12 to 15, constituted in rough description as follows: The boss 83*b* of a cup-shape outer clutch 83 is spline-fitted onto the transmission shaft 47 to rotate together. An inner clutch 84 is coaxially placed on the axially inner side of the outer clutch 83. The hub portion 84*a* of the inner clutch 84 is spline-fitted onto the primary reduction small gear 74 to rotate together. Incidentally, the primary reduction small gear 74 is rotatably attached to the transmission shaft 47.

Plural number of outer clutch plates 85 are placed in the outer clutch 83 and on both sides of them are placed two pressing plates 86 and 86. Those components 85 and 86 are engaged with the outer clutch 83 so as to rotate together. Inner clutch plates 87 are placed among the outer clutch plates 85 and the pressing plates 86. The inner clutch plates 87 are engaged with the outer periphery of the inner clutch 84 so as to rotate together.

A cam surface 83a is formed inside the outer clutch 83 and weights 88 are placed between the cam surface 83a and the pressing plates 86 located on the outer side. As centrifugal force works on the weights 88, they are moved toward the left and radially outward of the outer clutch 83 in FIG. 12 (in the clutch engagement direction) to press and move the pressing plates 86 and make the outer and inner clutch plates 85 and 86 engage with each other. Incidentally, the upper half of FIG. 12 shows the centrifugal clutch mechanism 17 in the disengaged state and the lower half shows the engaged state.

The centrifugal clutch mechanism 17 is provided with a clutch plate anti-stick mechanism 90. The clutch plate anti-stick mechanism 90 is constituted with plate springs 91 interposed between the outer clutch plates 85, and between the outer clutch plates 85 and the pressing plates 86 to urge the outer clutch plates 85 and the pressing plates 86 in the direction of parting from each other.

To prevent the inner clutch plates 87 from moving in the axial direction, pins 92 are passed through the inner clutch plates 87 at circumferential intervals. Coil springs 93 are placed among the inner clutch plates 87 to urge them in the direction of parting from each other.

In the centrifugal clutch mechanism 17 of this embodiment, the weights 88 move radially outward by centrifugal force as the engine revolution increases, and their axial positions are determined with the cam surface 83a. When the engine revolution exceeds a predetermined value by the opening operation of the throttle (not shown), the weights 88 press and move the pressing plates 86, and press together the outer and inner clutch plates 85 and 87. Then the engine revolution is transmitted from the transmission shaft 47 through the reduction gear mechanism 18 to the output shaft 48. The rotation of the output shaft 48 causes the rear wheel 7 to rotate through the drive sprocket 49 and the chain 50.

As the throttle is operated to close and the engine revolution decreases, the weights 88 move radially inward. When the engine revolution falls below a predetermined value, pressing force of the weights 88 is released, the outer and inner clutch plates 85 and 87 make relative rotation, and the engine revolution is disengaged between the transmission shaft 47 and the output shaft 48.

As the clutch disengages and the pressing force is released, the outer clutch plates 85 and the pressing plates 86 separate from each other with the repulsive force of the plate springs 91, and the inner clutch plates 87 part from each other with the repulsive force of the coil springs 93.

In this way, the outer and inner clutch plates 85 and 87 are prevented from sticking to each other due to lubricant oil and the clutch is prevented from dragging.

Since pins 92 prevent the inner clutch plates 87 from moving in the axial direction, the inner clutch plates 87 are prevented from tilting when the clutch is disengaged, which also helps prevent the clutch from dragging.

Next will be described the lubricant oil system of the engine 2.

The lubricant oil system is arranged that the lubricant oil in the lubricant oil chamber 95 formed at the bottom portion 22a of the crankcase 22 is drawn up and pressure-fed with an oil pump 96 to the bearings of the crankshaft 28, camshaft 31, and other sliding parts to be lubricated, and allowed to freely fall and return to the lubricant oil chamber 95.

The oil pump 96, as shown mainly in FIG. 11, is placed in the lower part of the first case 40 of the crankcase 22 and comprises a pump shaft 96a supported with a housing 97 having a suction port 97a and a discharge port 97b, and a pump gear 98 attached to the outside end portion of the pump shaft 96a.

A suction passage 40f communicating with the suction port 97a is formed in the first case 40 and made open through an oil strainer 99 at the bottom surface in the lubricant oil chamber 95. A lubricant oil supply passage 40g communicating with the discharge port 97b is formed also in the first case 40 and made to communicate through an oil filter 100 with a main supply passage 44a formed in the generator case 44. The downstream end of the main supply passage 44a is connected to an oil chamber 44c communicating with the left end surface of the crankshaft 28.

An oil passage 28e communicating with the oil chamber 44c is formed axially in the crankshaft 28 and made open, through a branch passage 29a formed in the crankpin 29, to a connecting bearing portion 101 where the crankpin 29 and the connecting rod 27 are interconnected.

The lubricant oil drawn in with the oil pump 96 is pressure-fed through the supply passage 40g and the main supply passage 44a to the oil passage 28e and then through the branch passage 29a to the connecting bearing portion 101. The lubricant oil supplied to the connecting bearing portion 101 is spread with oil feeding pressure and centrifugal force of the crankshaft 28 within the crank chamber 37. Part of the spread lubricant oil enters the reduction chamber 39 to lubricate the secondary reduction small gear 52a and secondary reduction large gear 48a and falls into the lubricant oil chamber 95.

Next will be described the constitution of lubricating the centrifugal clutch mechanism 17.

As shown in FIGS. 3 and 7, part of the centrifugal clutch mechanism 17 is located in the area, as seen in the direction at right angles to the crankshaft, where lubricant oil is spread from the connecting bearing portion 101 of the connecting rod 27 and the crankpin 29. That is to say, the outer and inner clutch plates 85 and 87 of the centrifugal clutch mechanism 17 are located to face the crank chamber 37.

An lead-in opening 103 for leading the lubricant oil spread from the connecting bearing portion 101 into the clutch chamber 38 is formed in the second peripheral wall 41a that defines the crank chamber 37 and the clutch chamber 38.

The clutch support wall portion 41d is integrally formed with a guide portion 104 extending to the inward of the clutch chamber 38. The guide portion 104 is located on the extension of the line interconnecting the crankshaft 28 and the transmission shaft 47 and comprises a lubricant oil receiving portion 104a extending vertically so as to generally face the lead-in opening 103 and a guide portion 104b continuously extending in an arcuate shape from the lower end of the lubricant oil receiving portion 104a toward the underside of the transmission shaft 47. The guide portion 104b is located as inserted into the truncated-cone-shaped boss portion of the inner clutch 84.

With the above arrangement, the lubricant oil entering through the lead-in opening 103 is received with the guide portion 104, guided more to the inner side than to the outer side of the centrifugal clutch mechanism 17, supplied by centrifugal force of the centrifugal clutch mechanism 17 between the outer and inner clutch plates 85 and 87, and supplied to the engaging area of the primary reduction large and small gears 75 and 74 (as shown with arrows in FIGS. 3 and 7).

The centrifugal clutch mechanism lubricating structure of the present embodiment is arranged that the lubricant oil supplied to the connecting bearing portion 101 of the crankpin 29 and the connecting rod big end 27a is led to the centrifugal clutch mechanism 17. Therefore, it is possible to supply a large amount of lubricant oil that is spread from the connecting bearing portion 101 to the centrifugal clutch mechanism 17 to prevent the outer and inner clutch plates 85 and 87 from being seized by heat without employing a special lubrication oil passage.

This embodiment makes it possible to lead the lubricant oil from the crank chamber 37 effectively into the clutch chamber 38 with a very simple constitution since the centrifugal clutch mechanism 17 is located, as seen in the direction at right angles to the crankshaft, in the area over which the lubricant oil from the connecting bearing portion 101 is spread, and the lead-in opening 103 for permitting the entry of lubricant oil is formed in the second peripheral wall 41a that defines the clutch chamber 38 and the crank chamber 37.

This embodiment is arranged that the clutch support wall portion 41d is integrally formed with a guide portion 104 extending to the inward of the clutch chamber 38. The guide portion 104 is located on the extension of the line interconnecting the crankshaft 28 and the transmission shaft 47 and comprises a lubricant oil receiving portion 104a extending vertically so as to generally face the lead-in opening 103 and a guide portion 104b continuously extending in an arcuate shape from the lower end of the lubricant oil receiving portion 104a toward the underside of the transmission shaft 47. Therefore, lubricant oil is supplied more securely to the outer and inner clutch-plates 85 and 87.

Next will be described the kick mechanism of the engine 2.

As mainly shown in FIGS. 5, 9, and 10, a kick shaft 110 is placed parallel to and nearly vertically below the output shaft 48. The kick shaft 110, as seen at right angles to the crankshaft direction, is journal-supported at the portion inside the drive sprocket 49 with the boss portion 40h of the first case 40 and at the outside portion with the boss portion 44b formed integrally with the generator cover 44.

A kick arm 111 is attached to the outer end of the kick shaft 110. A kick gear 112 is spline-fitted, to be axially slidable, onto the inside end portion of the kick shaft 110 and located inside the first case 40. A return spring 113 is wound around the inside end portion of the kick shaft 110 to urge the kick shaft 110 toward the starting position.

A main intermediate shaft 114 and a sub-intermediate shaft 115 are placed between the kick shaft 110 and the crankshaft 28 and parallel to the kick shaft 110. The main intermediate shaft 114 extends between the first and second cases 40 and 41 and journal-supported with them. A main intermediate gear 116 capable of engaging with the kick gear 112 is attached to the main intermediate shaft 114.

The sub-intermediate shaft 115 is journal-supported with the bearing portion 40j formed in the first case 40. The inside and outside ends of the sub-intermediate shaft 115 project respectively inward and outward of the first case 40. A first intermediate gear 115a for engaging with the main intermediate gear 116 is integrally formed inside the case of the sub-intermediate shaft 115 and a second intermediate gear 117 is attached outside the case. The second intermediate gear 117 engages with a first crank gear 121 which will be described later.

As the kick arm 111 is kicked down, the kick shaft 110 rotates, the kick gear 112 moves axially and engages with the main intermediate gear 116 to transmit the rotation to the first crank gear 121 through the first and second intermediate gears 115a and 117 and rotate the crankshaft 28.

Part of the crankshaft 28 between the left journal bearing 35 and the sleeve 43 of the generator 42 is provided with a one-way clutch 120, the first crank gear 121, and a cam sprocket 122 in the order from outer side.

The one-way clutch 120 is provided with a starting gear 120a connected through an idler gear 124 to a drive gear 125a of a starter motor 125. The starter motor 125, with its motor axis parallel to the crankshaft 28, is secured to the front wall of the crankcase 22.

The kick gear 112, the main intermediate gear 116, and the first intermediate gear 115a are located in a position that communicates with the lubricant oil chamber 95 inside the first case 40. The second intermediate gear 117, the first crank gear 121, and the cam sprocket 122 are located outside the first case 40.

Since the kick mechanism of this embodiment is arranged that the kick gear 112, the main intermediate gear 116, and the first intermediate gear 115a are located in the position that communicates with the lubricant oil chamber 95, engaging parts of those gears are sufficiently lubricated.

Since the sub-intermediate shaft 115 is made to pass through the first case 40 from the inside to the outside to transmit the rotation of the kick shaft 110 from the inner side of the sub-intermediate shaft 115 to the outer side, and from the second intermediate gear 117 on the outer side to the crankshaft 28 through the first crank gear 121, it is possible to locate the first crank gear 121 on the outer side than the crank journal portion 28c, to reduce the distance between the crankshaft bearings 35 and 36, and to journal-support the crankshaft 28 while reducing the bending moment due to the connecting rod 27. It is also possible to secure the layout space for the cam sprocket 122 and the second crank gear 127 to facilitate the layout around the crankshaft. In other words, if it were arranged that the rotation of the kick shaft 110 is transmitted to the crankshaft 28 within the first case 40, a gear would be required between the left crankshaft bearing 35 and the left crank arm 28a, the distance between the left and right bearings 35 and 36 would increase to the disadvantage of the bending moment mentioned above.

Since this embodiment is arranged that the kick shaft 110 is located nearly vertically below the output shaft 48, the kick arm 111 is easy to kick down and the size of the engine 2 can be reduced in the longitudinal direction of the vehicle.

Part of the kick shaft 110 on the inner side in the vehicle width direction of the rear wheel drive sprocket 49 is journal-supported with the first clutch support wall portion 40d, part of it on the outer side in the vehicle width direction is journal-supported with the generator case 44, and the kick arm 111 is attached to part of the kick shaft 111 projecting to the outer side of the kick shaft 110 than the generator case 44. Therefore, it is possible to place the kick shaft 110 and the kick arm 111 in optimum positions for kicking down without interfering with the rear wheel drive sprocket 49.

As shown in FIG. 4, the kick shaft 110, as seen in the crankshaft direction, is located within the axial projection area of the transmission case 45 and within the axial projection area of the centrifugal clutch mechanism 17. That is to say, it is located nearly just below the driven pulley 56.

Since the kick shaft 110 is placed on the opposite side of the transmission case 45 as described above, a space for placing the kick shaft need not be secured in the transmission case 45, so that it is possible to place the drive pulley 55 and the driven pulley 56 of the CVT 16 close to each other to the extent that only a small gap (b) (see FIG. 3) exists and accordingly the dimension of the engine 2 is reduced in the longitudinal direction of the vehicle.

Since the kick shaft 110 is placed within the area of projection in the crankshaft direction of the crankcase 45, it is possible to place the kick shaft 110 in a position that is near the crankshaft 28 and easy to kick down.

Since this embodiment is arranged that the centrifugal clutch mechanism 17 is placed in the vicinity on the inner side in the crankshaft direction of the driven pulley 56, and since the kick shaft 110 is placed in a position that is within the axial projection area of the centrifugal clutch mechanism 17 and nearly vertically below the transmission shaft 47, it is possible to utilize a free space within the projection area of the centrifugal clutch mechanism to locate the kick shaft 110 in the optimum position for kicking down and to reduce the size of the engine 2 in the vehicle's longitudinal direction.

A balancer shaft 129 is placed parallel to and rearward above the crankshaft 28. The balancer shaft 129 is journal-supported through balancer shaft bearings 130 and 131 with the first and second cases 40 and 41. The left end of the balancer shaft 129 projects outside the first case 40 and is connected to a balancer gear 132. A damping member 133 is attached to the inside circumferential surface of the balancer gear 132.

Here, the left and right crank arms 28a and 28b of the crankshaft 28 are located inside the balancer bearings 130 and 131, and the balancer weight 129a of the balancer shaft 129 is placed between the left and right crank arms 28a and 28b and near the crankshaft 28 so as to be superposed on the rotary locus of the crankpin 29. This makes the area around the balancer shaft compact.

The crankshaft 28 is press-fit into the first crank gear (first drive gear) 121 to which is attached a second crank gear (second drive gear) 127 to rotate together. The balancer gear (second driven gear) 132 engages with the second crank gear 127. That is to say, inside circumferential teeth 127a are formed on the inside circumferential surface of the second crank gear 127, with the inside circumferential teeth 127a engaging with the outside circumferential teeth 121a of the first crank gear 121 (see FIG. 6). In this way, the rotation of the crankshaft 28 is transmitted from the first crank gear 121 through the second crank gear 127 to the balancer gear 132.

The pump gear (first driven gear) 98 is connected through the second intermediate gear 117 to the first crank gear 121. In this way, the first crank gear 121 and the second intermediate gear 117 are used for both kick starting and oil pump drive.

The one-way clutch 120, the first crank gear 121, and the cam sprocket 122 attached to the crankshaft 28 are held to be axially immovable between the sleeve 43 and the journal bearing 35 as a nut 123 is screwed and tightened to the left end portion of the crankshaft 28.

This embodiment is arranged that the second intermediate gear 117 engaging with the first crank gear 121 is used both for transmitting the rotation of the kick shaft 110 to the crankshaft 28 and for transmitting the rotation of the crank-shaft 28 to the gear pump 98, so that it is possible to reduce the crankshaft length accordingly and make the engine compact in width.

This embodiment is also arranged that the crankshaft 28 is press fit into the first crank gear 121 that engages both with the inside circumferential teeth 127a of the second crank gear 127 and with the second intermediate gear 117. Therefore, the length of part of the first crank gear 121 press-fit over the crankshaft 28 can be taken long enough to reliably transmit the rotation of the crankshaft 28 to the pump gear 98 and the balancer gear 132.

This embodiment is arranged that the outside circumferential teeth 121a of the first crank gear 121 engages with the inside circumferential teeth 127a of the second crank gear 127. Therefore, it is easy to install the second crank gear 127 and remove it for maintenance. That is, the second crank gear 127 can be easily removed from the first crank gear 121 after removing the nut 123 from the crankshaft 28 and taking out the sleeve 43 and the one-way clutch 121.

The positioning arrangement of various shafts of the engine 2 is as follows.

As seen in the crankshaft direction, the transmission shaft 47 and the output shaft 48 are behind and on the same level with the crankshaft 28. The balancer shaft 129 and the reduction shaft 52 are placed above the plane C that includes the axes of the crankshaft 28 and the output shaft 48. The kick shaft 110, the pump shaft 96a, and the main and sub-intermediate shafts 114 and 115 are placed above the plane C.

The kick shaft 110 is placed nearly vertically below the output shaft 48. The pump shaft 96a is placed nearly vertically below the balancer shaft 129. The main and sub-intermediate shafts 114, 115 are placed on the line interconnecting the crankshaft 28 and the kick shaft 110.

This embodiment is arranged that the balancer shaft 129 is placed above the plane C that includes the axes of the crankshaft 28 and the output shaft 48, and the kick shaft 110 and the pump shaft 96a of the oil pump 96 are below the plane C, so that those components are well balanced in upper and lower positions to avoid increase in the engine size. That is, a free space exists behind the cylinder bore and above the plane C, and the space is used to place the balancer shaft 129. Since the balancer shaft 129 rotates with a large rotation locus of the weight 129a, if the weight were dipped in lubricant oil, a large amount of horsepower would be lost as lubricant oil is stirred. With this embodiment, however, the balancer shaft 129 does not stir lubricant oil. This embodiment is also arranged that the reduction shaft 52 is placed by utilizing the free space located above the plane C and between the balancer shaft 129 and the output shaft 48. Although the reduction shaft 52 is placed in a high position that is less likely to be spread with lubricant oil, since lubricant oil spread from the connecting bearing portion 101 of the connecting rod of the crankshaft 28 is supplied to the reduction gear 75 and other parts, no problem occurs as to poor lubrication.

Since the kick shaft 110 is placed nearly vertically below the output shaft 48, it is possible to reduce the longitudinal size of the engine 2 and place the kick shaft 110 in a position where it is easy to kick down.

Figure 17:
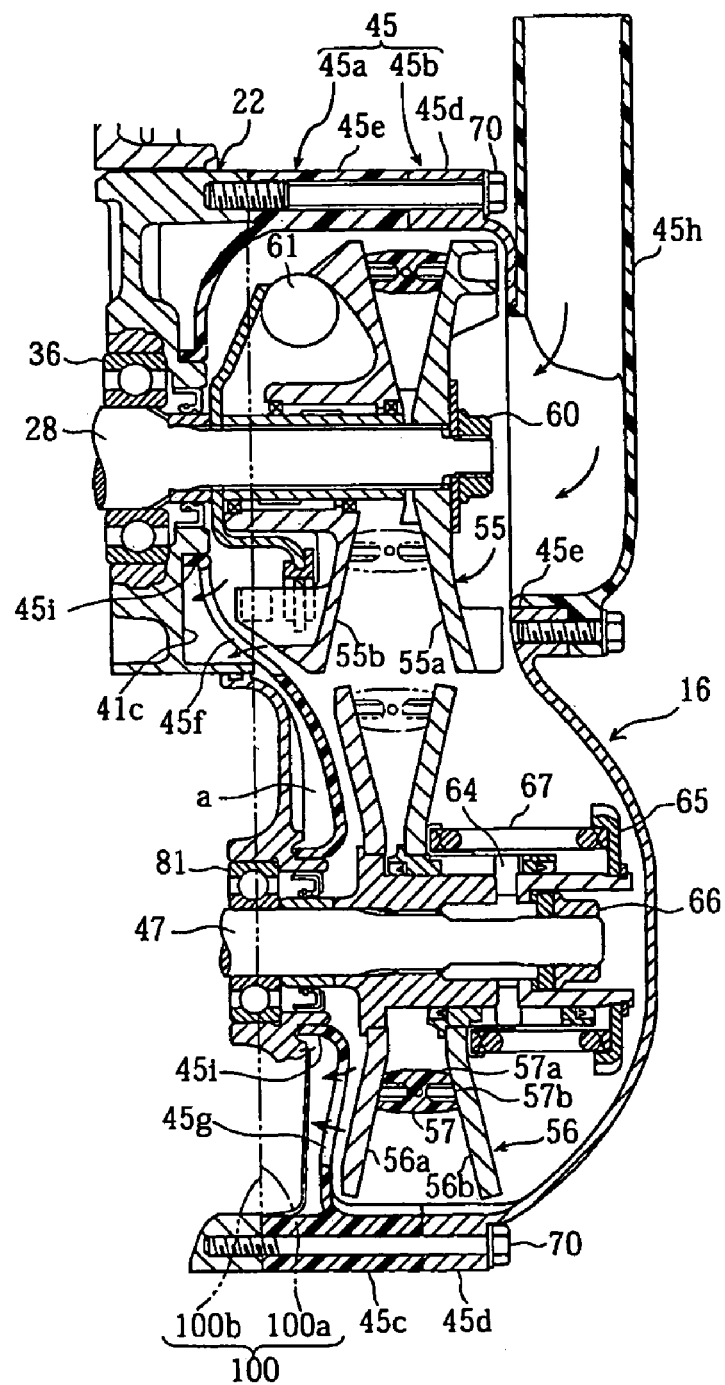
FIG. 17 is a sectional plan view of an engine as the second embodiment of the invention.
Figure 18:
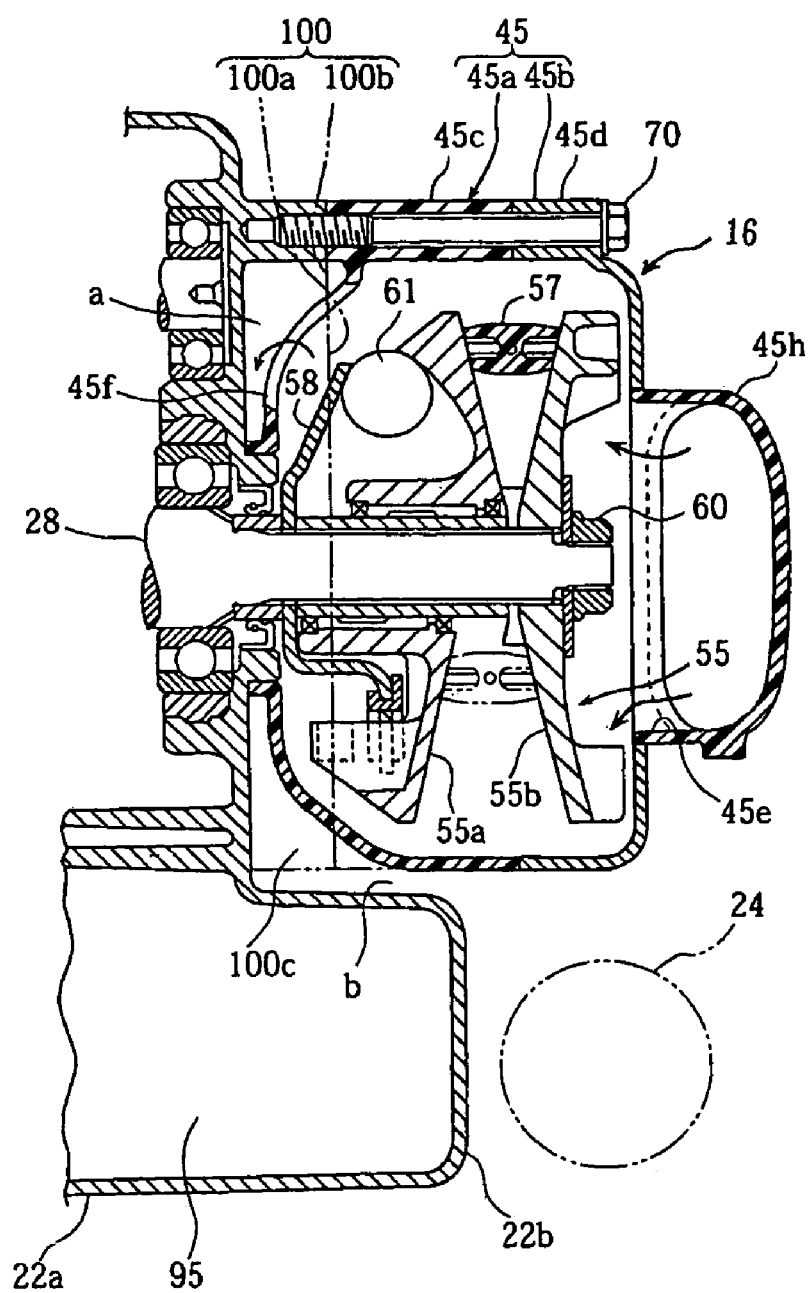
FIG. 18 is a sectional rear view of the above second embodiment engine.
Figure 19:
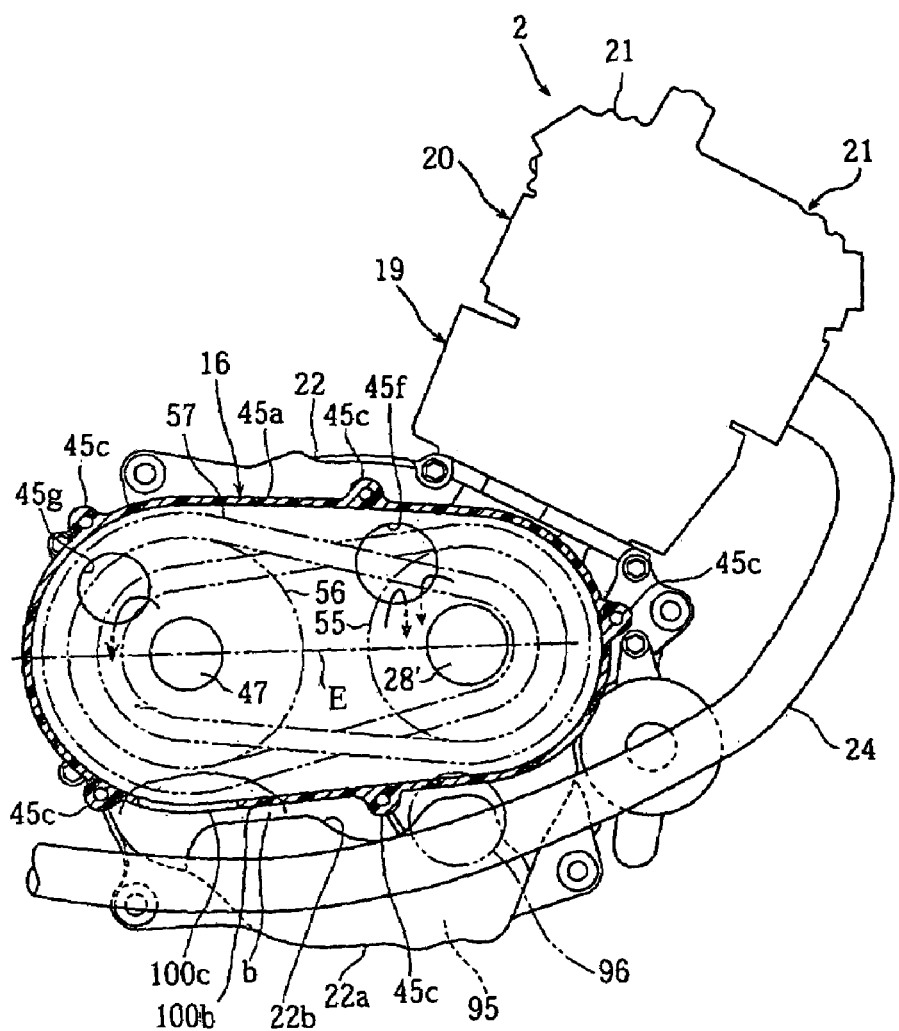
FIG. 19 is a right side view of the above second embodiment engine.

FIGS. 17 to 19 are for explaining the second embodiment of the invention. In the drawings, the same reference numerals as those in FIGS. 1 to 15 denote the same or equivalent parts. This embodiment is an example arranged to air-cool the transmission case 45.

The transmission case 45 is provided with an inlet 45e for introducing air inward and outlets 45f and 45g for discharging air outward. The inlet 45e is formed in the aluminum alloy lid 45b in alignment with the axis of the drive pulley 55. The downstream end opening of an air introducing duct 45h is fit to the inlet 45e. The air introducing duct 45h is secured to the lid 45b with bolts and extends toward the front of the vehicle.

The outlets 45f and 45g are formed in the resinous case 45a and open to the space (a) between the transmission case 45 and the crankcase 22. The outlets 45f and 45g are also formed to be placed in the area above the line E interconnecting the crankshaft 28 and the transmission shaft 47, namely such that the bottom edges of the outlets 45f and 45g are located above the line E and that between the crankshaft inserting hole 28' and the transmission shaft inserting hole 47'.

A wall 100 is formed along the periphery of the transmission case 45 so as to surround the space (a) existing between the transmission case 45 and the crankcase 22. The wall 100 is formed in the area hatched in FIG. 19. An opening 100c is formed in the lower area (not hatched) and opens the space (a) to the external space.

The wall 100 is made up of an engine side wall portion 100a formed on the crankcase 22 side and a transmission wall portion 100b formed on the side of the resinous case 45a, with both wall portions made to face and contact each other.

The opening 100c is located above the swell portion 22b of the lubricant oil chamber 95 and communicates with external space through the space (b) between the swell portion 22b and the transmission case 45.

The second embodiment is arranged that the transmission case 45 is provided with the inlet 45e for introducing air inward and with the outlets 45f and 45g for discharging air outward, so that air is introduced into the transmission case 45 to positively cool the case. Moreover, since the outlets 45f and 45g are made open to the space (a) between the transmission case 45 and the crankcase 22, heat stagnant in the space (a) can be expelled as air is discharged, and the discharge of air also prevents heat on the crankcase side from being transmitted.

Since the outlets 45f and 45g are located above the line E interconnecting the crankshaft and the transmission shaft, rainwater or the like is prevented from entering the transmission case 45.

Since the outlets 45f and 45g are formed to be located on the back sides of the drive pulley 55 and the driven pulley 56 of the transmission case 45, it is possible to cause air to flow along the back sides of the pulleys where heat is likely to stagnate and prevent the temperature in the transmission case 45 more reliably from rising.

Since the wall 100 is formed to cover from above the space (a) between the transmission case 45 and the crankcase 22 and the lower part of the wall 100 is provided with the opening 100c, rainwater or the like is reliably prevented from entering the discharge openings 45f and 45g through the space (a) between the transmission case 45 and the crankcase 22.

Since part of the wall 100 is integrally formed with the case 45a with a resin member, heat on the crankcase side is restricted from being transmitted through the wall 100.

Incidentally, it is possible to arrange the first embodiment (shown in FIGS. 1 to 15) with the air introducing port 45e and outlets 45f, 45g as the second embodiment (shown in FIGS. 17 to 18). In that case, the temperature rise in the transmission case 45 is more reliably restricted.

With the present invention the crankshaft and/or transmission shaft are rotatably supported with the engine case and made to project in cantilever fashion into the transmission case that the fore-ends of the crankshaft and the transmission shaft need not be journal-supported with the transmission case. As a result, the transmission case need not have a bearing portion and may be reduced accordingly in size and weight. As a result of making the crankshaft and the like in the cantilever constitution, constitution for supporting the transmission case by means of the engine case need not require so higher rigidity, so that the supporting constitution may be simplified. Since a space is provide between the transmission case and the engine case, heat of the engine is less likely to be transmitted from the engine case side to the transmission case. Moreover, the air flow through the space occurring as the vehicle runs cools the transmission case itself to restrict its temperature rise, leading to the improvement in the durability of the V-belt. The reduction of the transmission case in size and weight as described above also restricts the area around the CVT of the engine from becoming large in size in spite of providing the space as described above.

With the present invention since the transmission shaft is supported at one end only with the engine case and the clutch mechanism is attached to part of the transmission shaft located in the engine case, the engine is prevented from becoming large in the transmission shaft direction due to the location of the clutch mechanism. As a result, it is possible to place the output shaft coaxially on the output side of the clutch mechanism and, unlike the parallel arrangement of the output shaft and the transmission shaft, avoid the engine size from increasing in the vehicle's longitudinal direction.

According to an embodiment of the present invention, at least part of the transmission case facing the engine case is made of a resin member. Therefore, it is possible to further reduce the size of the transmission case and improve the durability of the V-belt by restricting the temperature rise of the transmission case. That is to say, using the resin member increases the degree of freedom in the shape, and the transmission case can be made in a smaller size. Since the resin member transmits less heat in comparison with aluminum alloy or the like, the material commonly used for the case, the temperature rise in the transmission case is more reliably restricted.

As set forth in an embodiment of the present invention, the V-belt is a resinous belt by joining together a large number of blocks, with part of each block in contact with the drive pulley and driven pulley made of a resin member. Therefore, heat generated with the V-belt itself is restricted. That is to say, the resinous belt with the portion in contact with the drive pulley made of a resin member can produce the same transmission torque with a less squeezing force of the drive pulley in comparison with, for example, a rubber belt. Accordingly the heat generated by friction between the V-belt and the drive pulley is reduced, and the temperature rise of the belt itself is restricted.

As set forth in an embodiment of the present invention, the lubricant oil chamber formed with the engine case is made to swell out under the transmission case so that a space exists between itself and the transmission case. As a result, it is possible to prevent the overall size, especially the height, of the engine from increasing and prevent the temperature of the transmission case from rising while securing required capacity of lubricant oil chamber. In other words, if the engine case bottom were swelled downward to secure sufficient amount of lubricant oil, overall height of the engine would increase. The inventor of this invention has taken note of the presence of a relatively large, unused space below the transmission case placed by the side of the engine case, and arranged to make the lubricant oil chamber swell out into the space. As a result, the capacity of the lubricant oil chamber is secured without increasing the overall height of the engine. Since a space is created between the swell portion and the transmission case, it is possible to avoid transmission of heat of lubricant oil from being transmitted to the transmission case and to cool the transmission case itself with the air flow occurring through the space when the vehicle is moving.

The movable pulley half of the driven pulley attached to the transmission shaft is located on the outer side in the crankshaft direction of the fixed pulley half and the centrifugal clutch mechanism is installed adjacent to the fixed pulley half and inside in the crankshaft direction. Therefore, it is possible to secure a space on the inner side of the driven pulley of the transmission shaft and use the space for placing the centrifugal clutch mechanism. This makes it possible to coaxially place the output shaft on the opposite side of the driven pulley of the transmission shaft. As a result, the longitudinal engine size can be reduced without increasing the engine width.

Since the nut for attaching the driven pulley to the transmission shaft is sunk inward of the outside end of the coil spring in the crankshaft direction, the projection outward of the transmission shaft can be reduced when the movable pulley half is placed outer than the fixed pulley half to restrain the engine size from increasing in the crankshaft direction.

Since the coil spring is located at the outside end portion of the transmission shaft, the work of maintenance and replacement of the coil spring is made easy. That is, unlike placing the movable pulley half inside the fixed pulley half requiring removal of the entire driven pulley for maintenance or the like with poor workability, this invention eliminates the need for removing the entire driven pulley.

An embodiment of the present invention is arranged such that the coil spring is placed between the spring receiving member attached to the outer open edge of the cylindrical slide collar and the movable pulley half, and the slide collar is tightly fixed to the transmission shaft by means of the nut screwed, as sunk in the slide collar, onto the transmission shaft. Therefore, it is possible to reduce the outward projection in the direction of transmission shaft with a simple constitution while securing required length of the coil spring.

Since an embodiment of the present invention is arranged with a large diameter of the slide collar, with a small diameter at the fore-end of the transmission shaft, and with the nut placed inside the slide collar, it is possible to sink the nut inside the spring receiving member in the axial direction without any problem.

An embodiment of the present invention is arranged that at least part of the transmission case supported with the engine case is made of a resin member, the amount of heat transmitted from the engine case side through the supporting portion to the transmission case side is reduced further securely.

Since an embodiment of the present invention is arranged such that the transmission ease is divided into plural parts in the crankshaft direction, and one of the parts facing the engine case is made of a resin member, heat transmitted from the engine case side is reduced.

Also, since an embodiment of the present invention is arranged such that the transmission ease is provided with the air introducing port and the air outlets, the interior of the transmission case is positively cooled with the air introduced. Since it is also arranged that the outlets are made open to the space between the transmission case and the engine case, it is possible to expel the heat stagnant in the space with the discharged air and to restrain the transmission of heat from the engine case side.

Further, since an embodiment of the present invention is arranged such that the outlets are located only in the area of the transmission case above the line interconnecting the crankshaft and the transmission shaft, rainwater or the like is restrained from finding its way inside the transmission case. Also, an embodiment of the present invention is arranged that the outlets are located between the crankcase inserting hole and the transmission shaft inserting hole of the transmission case, so that the outlets are generally located behind the part of the V-belt between the drive an driven pulleys or behind the drive an driven pulleys. Therefore, it is possible to cause the air introduced into the transmission case to strike the V-belt or to flow along the back side of the pulley where heat is likely to stagnate, to cool the V-belt directly, and to prevent securely the temperature in the transmission case from rising.

Since an embodiment of the present invention is arranged such that the wall is formed to cover from above the space between the transmission case and the engine case, and since an embodiment of the present invention is arranged that the wall leaves open only the lower part of the space and the rest covered, rainwater or the like is securely prevented from finding its way through the space between the transmission case and the engine case into the outlets provided on the upper side of the transmission case.

Also, since an embodiment of the present invention is arranged such that at least part of the wall portion is made as a part of the transmission ease and made of a resin member, heat on the engine case side is restrained from being transmitted through the wall portion.

Moreover, since an embodiment of the present invention is arranged such that the transmission case is of a generally sealed constitution, rainwater, mud, and the like are nearly perfectly prevented from entering the transmission case. Since it is also arranged such that the V-belt is a resinous belt made by joining together a large number of blocks, with part of each block in contact with the drive pulley and driven pulley made of a resin member, heat produced by the friction between the belt and pulley is reduced in comparison with an arrangement using a rubber belt, and the internal temperature rise is restrained in spite of the sealed constitution of the transmission case.

What is claimed is:

1. An engine, comprising:
   a crankshaft supported for free rotation with an engine case, one end of the crankshaft projected from the engine case into a transmission case; and
   a drive pulley attached to the projected end of the crankshaft,
   a driven pulley attached to one end of a transmission shaft parallel to the crankshaft,
   a V-belt provided on one side of the engine case,
   wherein the transmission case is made as a component separate from or independent of the engine case and supported with the engine case so that a space is present between the engine case and the transmission case,
   wherein the drive pulley and the driven pulley are disposed adjacent to each other so as to generate a gap between outer circumferences thereof,
   wherein the V-belt is a resin belt comprising a plurality of connected blocks which are formed from a resin at portions thereof which are brought into contact with the drive pulley and the driven pulley.

2. The engine of claim 1 wherein at least part of a side surface of the transmission case that faces the engine case is a resin member.

3. The engine of claim 2, wherein a V-belt is a resinous belt formed by connecting together a plural number of blocks, with part of each block in contact with a drive pulley and the driven pulley being made of a resin member.

4. The engine of claim 3, wherein a lubricant oil chamber formed at the engine case is made to swell out below the transmission case so that a space is present between the lubricant oil chamber and the transmission case.

5. The engine of claim 4, wherein the drive pulley and driven pulley are made up of fixed pulley halves fixed to the crankshaft and the transmission shaft, and movable pulley halves that can axially slide on the crankshaft and transmission shaft, the movable pulley halves of the drive pulley and driven pulley are placed respectively on an inner side and an outer side with respect to a crankshaft direction, and a centrifugal clutch mechanism is attached to the transmission shaft on the inner side with respect to the crankshaft direction and adjacent to the driven pulley.

6. The engine of claim 5, wherein the movable pulley half of the driven pulley is urged toward the fixed pulley half with a coil spring located on the outer side, with respect to the crankshaft direction, of the movable pulley half, and a nut for attaching the driven pulley to the transmission shaft is placed to sink inside, with respect to the crankshaft direction, of the outer end of the coil spring.

7. The engine of claim 6, wherein the fixed pulley half is formed with a cylindrically shaped slide collar, with the slide collar fixed to the transmission shaft with another nut screwed to the transmission shaft so as to sink in the slide collar, and the coil spring is placed between a spring receiving member attached to an outer open edge of the slide collar and the movable pulley half.

8. The engine of claim 7, wherein the slide collar has an inside diameter greater than an outside diameter of the transmission shaft, a fore-end portion of the transmission shaft has an outside diameter smaller than that of another portion of the transmission shaft, and the nut is screwed onto the small diameter portion.

9. An engine, comprising:
a transmission shaft supported for free rotation with an engine case, one end of the transmission shaft is made to project from the engine case into a transmission case;
a clutch mechanism attached to part of the transmission shaft located in the engine case;
a drive pulley attached to the projected end of the crankshaft; and
a driven pulley attached to the projected end of the transmission shaft,
a V-belt provided on one side of the engine case,
wherein the drive pulley and the driven pulley are disposed adjacent to each other so as to generate a gap between outer circumferences thereof,
wherein the V-belt is a resin belt comprising a plurality of connected blocks which are formed from a resin at portions thereof which are brought into contact with the drive pulley and the driven pulley,
wherein the transmission case is made as a component separate from or independent of the engine case and supported with the engine case so that a space is present between the engine case and the transmission case.

10. An engine comprising:
a crankshaft and a transmission shaft supported for free rotation with an engine case, one end of the crankshaft and one end of the transmission shaft are projected from the engine case into a transmission case; and
a drive pulley attached to the projected end of the crankshaft and attached to the projected end of the transmission shaft,
a driven pulley attached to one end of a transmission shaft parallel to the crankshaft,
a V-belt provided on one side of the engine case,
wherein the drive pulley and the driven pulley are disposed adjacent to each other so as to generate a gap between outer circumferences thereof,
wherein the V-belt is a resin belt comprising a plurality of connected blocks which are formed from a resin at portions thereof which are brought into contact with the drive pulley and the driven pulley,
wherein the transmission case is made as a component separate from or independent of the engine case and supported with the engine case so that a space is present between the engine case and the transmission case.

11. An engine comprising:
a crankshaft and a transmission shaft supported for free rotation with an engine case;
a transmission case made as a component separate from or independent of the engine case and supported with the engine case so that a space is present between the engine case and the transmission case;
at least part of a side surface of the transmission case that faces the engine case is a resin member;
a drive pulley attached to the projected end of the crankshaft and attached to the projected end of the transmission shaft;
a driven pulley attached to one end of a transmission shaft parallel to the crankshaft; and
a V-belt provided on one side of the engine case;
wherein the drive pulley and the driven pulley are disposed adjacent to each other so as to generate a gap between outer circumferences thereof,
wherein the V-belt is a resin belt comprising a plurality of connected blocks which are formed from a resin at portions thereof which are brought into contact with the drive pulley and the driven pulley.

12. The engine of claim 11, wherein at least part of the transmission case supported with the engine case is a resin member.

13. The engine of claim 12, wherein the transmission case is divided in a crankshaft direction into plural parts and, of the plural parts, those that face the engine case are resin members.

14. An engine of claim 13, wherein a V-belt is a resinous belt formed by connecting together a plural number of blocks, with part of each block in contact with a drive pulley and a driven pulley being made of a resin member.

15. The engine of claim 14, wherein a lubricant oil chamber formed at the engine case is made to swell out below the transmission case so that a space is present between the lubricant oil chamber and the transmission case.

16. An engine comprising:
a crankshaft and a transmission shaft supported for free rotation with the engine case;
a transmission case made as a component separate from or independent of the engine case and supported with the engine case so that a space is present between the engine case and the transmission case; and
a V-belt that is a resinous belt, formed by connecting together a plural number of blocks, with part of each block in contact with a drive pulley and a driven pulley being made of a resin member, wherein the drive pulley and the driven pulley are disposed adjacent to each other so as to generate a gap between outer circumferences thereof.

17. The engine of claim 16, wherein a lubricant oil chamber formed at the engine case is made to swell out below the transmission case so that a space is present between the lubricant oil chamber and the transmission case.

18. An engine comprising:
a crankshaft and a transmission shaft supported for free rotation with an engine case;
a transmission case made as a component separate from or independent of the engine case and supported with the engine case so that a space is present between the engine case and the transmission case; and
a lubricant oil chamber formed at the engine case made to swell out below the transmission case so that a space is present between the lubricant oil chamber and the transmission case,
a V-belt that is a resinous belt, formed by connecting together a plural number of blocks, with part of each block in contact with a drive pulley and a driven pulley,
wherein the drive pulley and the driven pulley are disposed adjacent to each other so as to generate a gap between outer circumferences thereof.

19. The engine of claim 18, wherein the transmission case is provided with an inlet for introducing air inward and outlets for discharging air outward, with the outlets open and directed toward the space between the transmission case and the engine case.

20. The engine of claim 19, wherein the outlets are formed to be located in an area of the transmission case above a line interconnecting the crankshaft and transmission shaft.

21. The engine of claim 20, wherein the outlets are formed to be located between a crankshaft insertion hole and a transmission shaft insertion hole of the transmission case.

22. The engine of claim 18, wherein the transmission case is generally of a tightly sealed constitution and a V-belt is a resin-made belt formed by connecting together a plural number of blocks, with part of each block in contact with a drive pulley and a driven pulley being made of a resin member.

23. An engine comprising:
a crankshaft and a transmission shaft supported for free rotation with an engine case;
a transmission case made as a component separate from or independent of the engine case and supported with the engine case so that a space is present between the engine case and the transmission case; and
a lubricant oil chamber formed at the engine case made to swell out below the transmission case so that a space is present between the lubricant oil chamber and the transmission case,
wherein a wall portion is formed to cover from above the space between the transmission case and the engine case.

24. The engine of claim 23, wherein the wall portion leaves open a lower portion only of the space between the transmission case and the engine case and covers a remaining part of the space.

25. The engine of claim 24, wherein at least part of the wall portion is formed as part of the transmission case and made of a resin member.

* * * * *